US009384572B2

(12) United States Patent
Holten et al.

(10) Patent No.: US 9,384,572 B2
(45) Date of Patent: Jul. 5, 2016

(54) DATA ANALYSIS SYSTEM

(71) Applicant: SynerScope B.V., S-Hertogenbosch (NL)

(72) Inventors: Danny Hubertus Rosalia Holten, Kerkrade (NL); Johannes Cornelius Adrianus Buenen, S-Hertogenbosch (NL)

(73) Assignee: SYNERSCOPE B.V., S-Hertogenbosch (NL)

( * ) Notice: Subject to any disclaimer, the term of this patent is extended or adjusted under 35 U.S.C. 154(b) by 0 days.

(21) Appl. No.: 14/631,647

(22) Filed: Feb. 25, 2015

(65) Prior Publication Data
US 2015/0193956 A1 Jul. 9, 2015

Related U.S. Application Data

(63) Continuation of application No. 14/068,900, filed on Oct. 31, 2013, now abandoned, which is a continuation-in-part of application No. 13/102,648, filed on May 6, 2011, now Pat. No. 8,768,804.

(51) Int. Cl.
G06Q 40/00 (2012.01)
G06T 11/20 (2006.01)
G06T 11/00 (2006.01)

(52) U.S. Cl.
CPC ............. G06T 11/206 (2013.01); G06T 11/001 (2013.01); G06T 2207/20072 (2013.01)

(58) Field of Classification Search
CPC ....... G06Q 10/00; G06Q 20/00; G06Q 30/00; G06Q 40/00
USPC ...................................... 705/3–44
See application file for complete search history.

(56) References Cited

U.S. PATENT DOCUMENTS 6,934,858 B2 8/2005 Woodhill
7,024,419 B1 4/2006 Klenk et al.
(Continued)

FOREIGN PATENT DOCUMENTS

JP H05-328144 A 12/1993
JP H11-231997 A 8/1999
(Continued)

OTHER PUBLICATIONS

Feb. 3, 2015 Decision to Grant issued in corresponding Japanese Patent Application No. JP2014-508839 (with English Translation).
(Continued)

Primary Examiner — Frantzy Poinvil
(74) Attorney, Agent, or Firm — Kenealy Vaidya LLP

(57) ABSTRACT

A data analysis system (1) for displaying data facilitating visual analysis of communication transaction is disclosed. The system includes a transactions database (3) operable to store transaction records (5) defining communication transactions and a processing module (11) operable to determine a hierarchy having a tree structure wherein leaf nodes in the lowest level of the hierarchy correspond to sources and destinations associated with communication transactions represented by transaction records 5) stored in the transactions database (5). The processing module (11) then causes representations of the communication transactions to be displayed on a display screen (13) by determining for each transaction a first set of control co-ordinates comprising co-ordinates associated with elements in a path in the tree structure connecting the source and destination associated with a communication transaction via the closest common parent in the hierarchy common to the source and destination; determining for each transaction a second set of control co-ordinates for drawing a straight line between co-ordinates associated with the source and destination associated with the communication transaction; calculating as a set of control co-ordinates for representing a transaction weighted averages of corresponding co-ordinates in the first and second set, weighted by a bundling factor; and representing each of the communication transaction as a line drawn utilizing the calculated control co-ordinates for each transaction.

16 Claims, 17 Drawing Sheets

(56) References Cited

U.S. PATENT DOCUMENTS

| | | | |
|---|---|---|---|
| 7,124,302 | B2 | 10/2006 | Ginter et al. |
| 7,401,057 | B2 | 7/2008 | Eder |
| 7,606,168 | B2 | 10/2009 | Robinson et al. |
| 7,617,185 | B2 | 11/2009 | Werner et al. |
| 7,777,743 | B2 | 8/2010 | Pao et al. |
| 7,809,659 | B1 * | 10/2010 | Paiz ................ G06F 17/30873 706/16 |
| 7,849,408 | B1 * | 12/2010 | Messinger ............. H04L 41/22 715/733 |
| 7,962,485 | B1 | 6/2011 | Trandal et al. |
| 8,494,909 | B2 | 7/2013 | Goncalves |
| 8,694,501 | B1 | 4/2014 | Trandal et al. |
| 2003/0007676 | A1 | 1/2003 | Cato |
| 2005/0019292 | A1 | 1/2005 | Acher et al. |
| 2005/0080655 | A1 | 4/2005 | Sengir et al. |
| 2005/0192926 | A1 * | 9/2005 | Liu ........................ G06N 5/02 |
| 2007/0005967 | A1 * | 1/2007 | Mister .................... G06F 21/36 713/168 |
| 2007/0171716 | A1 | 7/2007 | Wright et al. |
| 2008/0203170 | A1 * | 8/2008 | Hammad ............... G06K 17/00 235/492 |
| 2009/0125543 | A1 | 5/2009 | Patil et al. |
| 2009/0313041 | A1 | 12/2009 | Eder |
| 2010/0077352 | A1 | 3/2010 | Heer et al. |
| 2011/0055074 | A1 * | 3/2011 | Chen ..................... G06Q 20/10 705/39 |
| 2012/0041790 | A1 * | 2/2012 | Koziol ................... G06Q 40/08 705/4 |

FOREIGN PATENT DOCUMENTS

| | | |
|---|---|---|
| JP | 2006-059118 A | 3/2006 |
| JP | 2007-206297 A | 8/2007 |
| JP | 2007-257223 A | 10/2007 |
| WO | 2010/064939 A1 | 6/2010 |

OTHER PUBLICATIONS

Danny Holten, "Hierarchical Edge Bundles: Visualization of Adjaceny Relations in Hierarchical Data", IEEE Transactions on Visualization and Computer Graphics, vol. 12, No. 5, Sep./Oct. 2006.

Danny Holten, "A User Study on Visualizing Directed Edges in Graphs", CHI 2009, Apr. 4-9, 2009, Boston, MA pp. 1-10.

Bas Cornelissen et al., "Execution Trace Analysis through Massive Sequence and Circular Bundle Views", (http://www.west.nl/), pp. 1-40.

Danny Holten, "Visualization of Graphs and Trees for Software Anaylsis", May 20, 2009, 163 pages.

Wikipedia: "Framebuffer", Internet article, Jan. 31, 2011.

Holten, et al., "Trace visualization using hierarchical edge bundles and massive sequence views", Visualizing Software for Understanding and Analysis, 4th IEEE International Workshop, pp. 47-54, Jun. 2007.

Draper, et al., "A survey of radial methods for information visualization", IEEE Transactions on Visualization and Computer Graphics, IEEE Service Center, Sep. 1, 2009.

International Preliminary Report on Patentability for PCT Patent App. No. PCT/EP2012/058309 (Nov. 12, 2013).

* cited by examiner

Fig. 6

DATA ANALYSIS SYSTEM

CROSS-REFERENCE TO RELATED APPLICATIONS

This application is a continuation of U.S patent application Ser. No. 14/068,900, entitled "DATA ANALYSIS SYSTEM", now abandoned, and filed Oct. 31, 2013, which is a continuation-in-part of U.S patent application Ser. No. 13/102,648, now U.S Pat. No. 8,768,804, entitled "DATA ANALYSIS SYSTEM" and filed May 6, 2011, the entire contents of which are incorporated in their entireties by reference.

FIELD OF THE INVENTION

The present application concerns a data analysis system.

More specifically embodiments of the present application concern methods and apparatus for processing transaction data to identify deviations or anomalies from normal or expected patterns of transactions and to assist in the interpretation of these deviations or anomalies. Such transactions may include communication transactions (e.g. telephone calls, emails, text messages, instant messages, social media etc), financial transactions, accounting transactions, insurance transactions, security trading, and security access. Such deviation may arise due to the occurrence of significant events, system problems or failures, design mistakes, erroneous data entries or fraudulent activity.

BACKGROUND TO THE INVENTION

Current methods for detecting issues and analyzing disruptions within telecommunications networks are often reactive, such that diagnostic and corrective action is not initiated until after problems have been reported. This leads to a poor experience for network users as they must deal with interrupted services and face lengthy issue-resolution times. The identification of deviations or anomalies from normal or expected patterns of communication transactions can be very useful for proactively identifying network issues before they have a significant impact on users, and enabling the diagnostic and corrective action to be initiated promptly. Furthermore, the ability to analyse communication transactions in this way provides a valuable means for accelerating both the diagnosis and resolution of such issues.

In addition, such an analysis of communication transactions can also be used to identify system design issues in order to optimise network configuration and utilisation, identify fraudulent behaviour etc. Moreover, such an analysis can also be used as a means for identifying and even interpreting significant events (e.g. weather, social, political and economic events). For example, it is possible to use the analysis of deviations in the expected patterns of mobile telecommunications such as calls and text messages to identify events such as crisis situations and the early signs of epidemics.

With the rapid advancement and wide-spread uptake of communication technologies, there are now vast numbers of communication transactions taking place daily. For example, worldwide there are more than 200 billion emails, 4 billion text messages and 90 million tweets sent every day. Consequently, one of the main problems faced when attempting to implement an analysis of communication transaction data is the massive amounts of data involved, and the incredible rate at which new data is created. In particular, communication transaction data is usually so substantial, dynamic and varied that it is extremely difficult to carry out a meaningful and conclusive analysis in a short space of time.

In view of the above an analysis system is desirable which assists with the efficient identification of deviations or anomalies in normal or expected patterns of transactions, entries or events, and the interpretation or diagnosis of the cause of these deviations or anomalies.

SUMMARY OF THE INVENTION

In accordance with one aspect of the present invention there is provided a method of generating a display, displaying data representing a plurality of communication transactions, the method comprising: determining a hierarchy having a tree structure wherein leaf nodes in the lowest level of the hierarchy correspond to sources and destinations associated with communication transactions to be represented; associating elements of the hierarchy with co-ordinates on a display screen; and representing each of the plurality of communication transactions by: determining for each transaction a first set of control co-ordinates comprising the co-ordinates associated with elements in a path in the tree structure connecting the source and destination associated with a communication transaction via the closest common parent in the hierarchy common to the source and destination; determining for each transaction a second set of control co-ordinates for drawing a straight line between co-ordinates associated with the source and destination associated with the communication transaction; calculating as a set of control co-ordinates for representing a transaction weighted averages of corresponding co-ordinates in the first and second set, weighted by a bundling factor; and representing each of the communication transactions as a line drawn utilizing the calculated control co-ordinates for each transaction.

Determining a first set of control co-ordinates may comprise determining a list of nodes on the tree structure for connecting the source and destination associated with a communication transaction via the closest common parent in the hierarchy common to the source and destination and removing the node corresponding to the closest common parent if the source and destination for the transaction are not both child nodes of a single parent node.

Determining a first set of control co-ordinates may also comprise appending as control co-ordinates in the set of control co-ordinates for representing a transaction multiple sets of control co-ordinates associated with the source and destination of the transaction to be represented.

Communication transactions may be represented as lines drawn utilizing the calculated control co-ordinates for each transaction with each communication transaction being represented by an appended series of b-splines as defined by groups of control co-ordinates in the calculated set of co-ordinates.

The lines corresponding to the b-splines may be determined by: determining co-ordinates for a number of points lying on the curve defined by the appended series of b-splines; and calculating co-ordinates for a set of quadrilaterals for representing the transaction on the basis of the co-ordinates of the number of points. The calculation of the co-ordinates for a set of polygons may be such to cause the points lying on the curve defined by the appended series of b-splines to lie on the midpoints of opposing ends of the quadrilaterals and the other sides of the quadrilaterals are parallel to a line connecting the midpoints of the opposing ends. Such quadrilaterals may then be colored.

The coloring of such quadrilaterals may be determined based upon a criterion associated with the transaction represented by the quadrilateral such as the timing, frequency or an amount associated with a transaction. Alternatively the coloring of quadrilaterals may vary along the length of the line drawn to represent a transaction.

Drawing lines representing each of the communication transactions may comprise rendering each of the lines in a graphics buffer and then combining the rendered images. Combining the rendered images may comprise: determining maximum color values for areas where lines overlap; determining color values for rendering lines in a constant color and calculating an alpha blend of the rendered lines; and utilizing the calculated maximum color values and the values of the determined alpha blend of constant color lines to determine the colors to be included in a final display.

The communication transactions represented may include: various kinds of communication transactions such as telephone calls, emails, text messages, instant messages, social media messages or posts; and various kinds of other transaction data like securities trading, insurance, electronic security access data and financial transactions such as credit card transactions; debit card transactions, banking transactions etc.

In accordance with another aspect of the present invention there is provided a data analysis system for displaying data facilitating visual analysis of communication transactions: the system comprising: a transactions database operable to store transaction records defining communication transactions; a display screen operable to display representations of communication transactions as lines connecting positions associated with a source and a destination for a communication transaction; and a processing module operable to determine a hierarchy having a tree structure wherein leaf nodes in the lowest level of the hierarchy correspond to sources and destinations associated with communication transactions represented by transaction records stored in the transactions database; associate elements of the hierarchy with co-ordinates on a display screen; and cause the display screen to display the representations of the communication transactions by: determining for each transaction a first set of control co-ordinates comprising the co-ordinates associated with elements in a path in the tree structure connecting the source and destination associated with a communication transaction via the closest common parent in the hierarchy common to the source and destination; determining for each transaction a second set of control co-ordinates for drawing a straight line between co-ordinates associated with the source and destination associated with the communication transaction; calculating as a set of control co-ordinates for representing a transaction weighted averages of corresponding co-ordinates in the first and second set, weighted by a bundling factor; and representing each of the communication transactions as a line drawn utilizing the calculated control co-ordinates for each transaction.

BRIEF DESCRIPTION OF THE DRAWINGS

Embodiments of the present invention will now be described in detail with reference to the accompanying drawings in which:

FIG. 6 is a schematic diagram illustrating the assignment of co-ordinates to the nodes of the tree diagram of FIG. 5;

DESCRIPTION OF THE EMBODIMENTS

Figure 1:
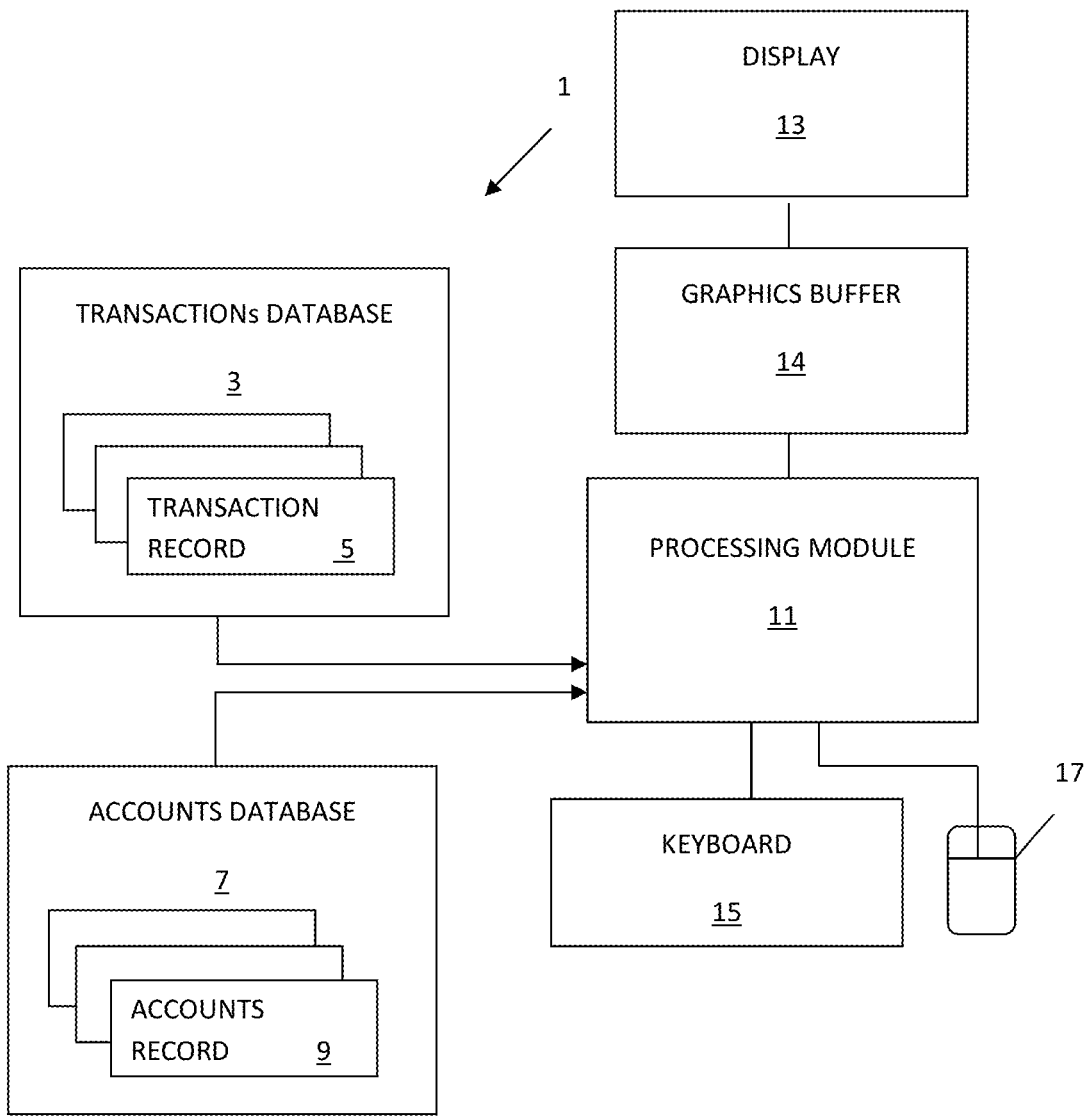
FIG. 1 is a schematic block diagram of a data analysis system in accordance with an embodiment of the present invention.

FIG. 1 is a schematic block diagram of a data analysis system 1 in accordance with an embodiment of the present invention. The data analysis system 1 comprises a transactions database 3 arranged to store transaction records 5; a processing module 11; and optionally an accounts database 7 arranged to store accounts records 9. The processing module 11 is arranged to retrieve data from the transactions and accounts databases 3, 5 and generate a graphic representation representing the transactions. Data for rendering representations of the transactions as lines on a display 13 generated and stored in a graphics buffer 14 connected to the processing module 11 and the display 13. In addition the processing module 11 is also responsive to user input via a keyboard 15 and a mouse 17 to enable a user to interact with the display and select groups of transactions for processing.

In this embodiment where the data analysis system 1 is arranged to facilitate the analysis of communication transaction data, the transactions database 3 will be configured to store transactions data relating to communication transactions. For fields other than communication transactions, the databases will or can be configured otherwise and hold different kinds of transactional data.

In a system for analyzing communication transactions each transaction record 5 stored in the transactions database 3 will comprise a number of data fields, which in the case of communication transactions will typically include any of the following:

Source (e.g. telephone number, email address, user identity etc.)
Destination (e.g. telephone number, email address, user identity etc.)
Date and Time
Transaction type (e.g. call, text message, email etc)
Size (e.g. duration, number of characters, data volume etc)
Cost
Source location information (e.g. physical address, IP address, longitude and latitude, serving mobile base station location etc.)
Destination location information (e.g. physical address, IP address, serving mobile base station location etc.)

If required, the accounts database 7 can store details relating to the account or subscription information of individual users of a communication system. For example, the accounts database 7 could store data relating to individual accounts such as:

User identity (e.g. name, telephone number, email address, username etc)
User location information (e.g. physical address etc)
Account number
Subscription details (e.g. tariff etc)

In this case, the accounts database 7 can be used in conjunction with the transactions database 3 to determine additional information regarding a communication transaction. By way of example, if the transactions database 3 contained transaction records 5 relating to fixed line telephone calls, but did not specify the source and destination locations, then the accounts database 7 could be used to perform a lookup between the telephone number of the source and/or destination and the location information/physical address of the source/destination. The records 5 in the transactions database 3, and optionally the accounts database 7, enables communications to be monitored. If unusual patterns of communication are detected, further investigation of potential issues or significant events can be initiated. Detection is, however, difficult due to the very large volumes of variable and highly dynamic data that are involved. It is for this reason that it is very important how the data is processed and the results of that processing are displayed as having the processing module 11 generate display data which makes potentially anomalous transactions more apparent to a user and thereby greatly facilitates the detection of issues or significant events.

As will be described in detail, in accordance with the present application data representing transactions is processed in a manner which enables large volumes of transaction data to be displayed simultaneously and facilitates user selection of subsets of the transaction data and rapid update of the display. This then enables an investigator to focus on transactions which share certain common attributes for further investigation.

The analytical process, apparatus and method described in this embodiment are designed to display and help the user detect the anomalous patterns resulting from anomalous behaviour. The patterns are the result of a sequence of transactions or transaction flow, and in the examples described herein the transactions take the form of communications transactions. The detection of anomalies that differentiate from the "normal" pattern of transactions can be expedited by leveraging visual analytics, in which the patterns in the communication transactions are represented visually. The human eye and brain can more quickly adapt to changes in visual representations of data then to representations where data is presented as indexes in rows, columns or tables.

The apparatus and method are designed for the purpose of visually representing the relationships and sequences that exist within the transactions, such that the detection of irregular activity occurs faster and more accurately as visually it stands out from the crowd of regular transactions. The greater the amount of data which can be visualized the more effective the analyst or observer/user can detect patterns, and the more accurate and timely the analysis can be performed, which is essential for communication transactions, as very large quantities of transactions are occurring at any given time. The larger the amount of data that a tool can visualize the larger the amount of time can be conceptualized thus the more stable and accurate the pattern analysis can be.

This can lead to an operator of a telecommunications network being able to quickly identify points of disruption or congestion within the network, determine the time frame of the disruption or congestion, identify the possible cause of the disruption or congestion, and take proactive steps to remedy the issue or counteract the problem.

To facilitate the identification of anomalous transactions, as will be described, in this embodiment, transactions are illustrated by lines connecting an origin (e.g. a base station of a mobile telecommunications network that is serving a source) and a destination (e.g. the base station serving the destination). The processing module 11 then generates a visual display which causes representations of transactions sharing similar characteristics to be bundled together.

Figure 2:
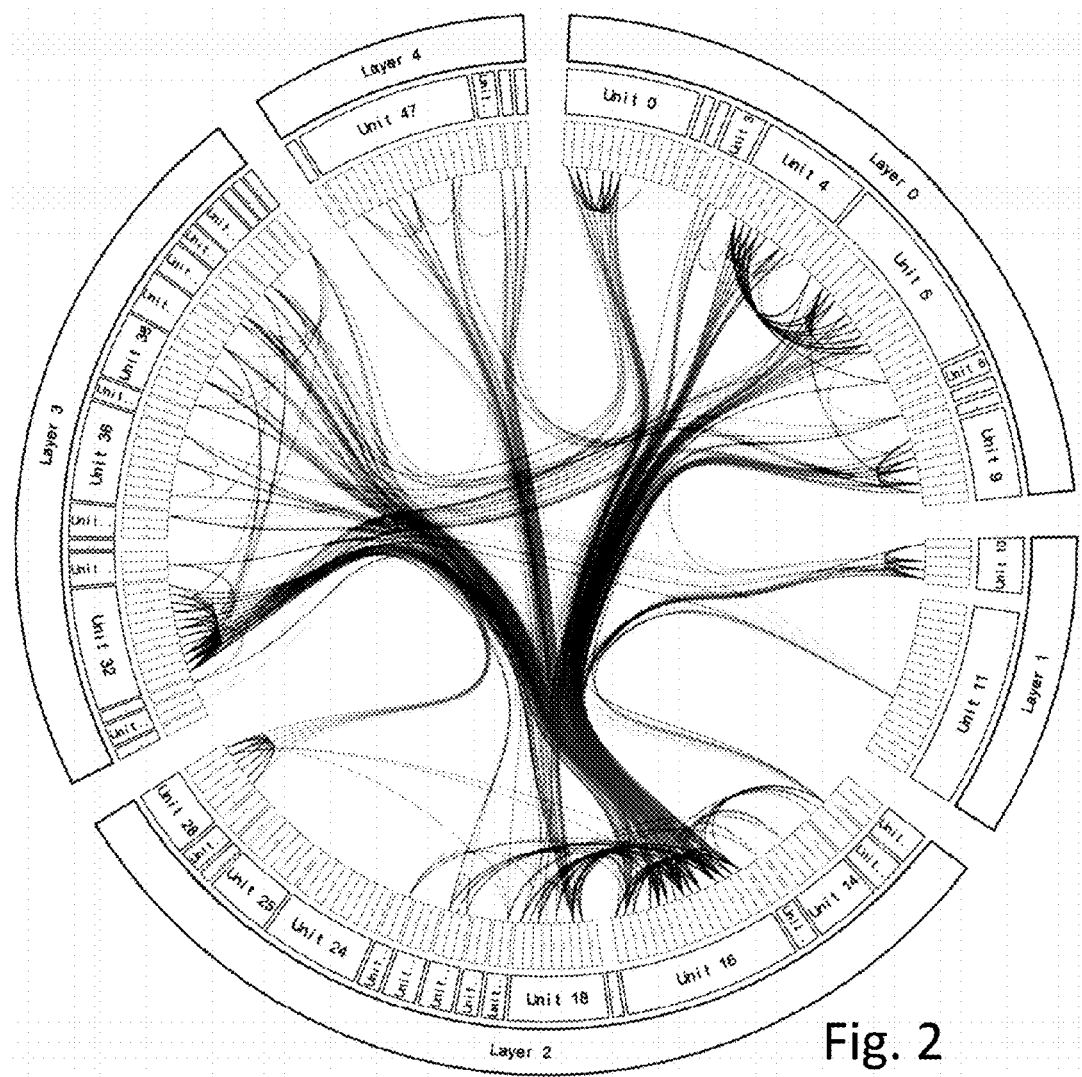
FIG. 2 is a schematic illustration of a user interface representing transactions to a user.

FIG. 2 is a schematic illustration of a user interface representing transactions to a user. In FIG. 2 curved lines connect points at the perimeter of a circle. Each of the lines is shaded from lighter to darker to indicate a direction of connection. Around the perimeter points are arranged into a hierarchy such as for example a hierarchy of locations e.g. country, region, sub-region, which can correspond to locations of base stations, telephone exchanges, email servers etc. These are illustrated by the curved sections at the perimeter of the illustration with the elements at the top of the hierarchy shown at the outside of the circle labelled layers 0-4, the new level of the hierarchy shown as units 1-50 and the lowest level of the hierarchy shown adjacent the lines in connecting points at the perimeter of the circle.

As indicated, transactions sharing common portions of a hierarchy are bundled together to indicate a volume of flow between two locations. As will be described by selecting data either by selecting groups of locations or a subset of transactions etc a user can home in on a group of suspect transactions for more investigation.

Additionally the display can be modified to highlight certain information. Thus for example in certain circumstances it may be desirable to distinguish between the source and destination of transactions. This could enable a subset of transactions to be displayed. The screen display could then be modified to color code the representations of the transactions to highlight some other aspect of the transactions such as the timing of the transactions or the frequency or size of the transactions to make potentially anomalous patterns more apparent.

The processing of the processing module 11 to generate a display such as is shown in FIG. 2 will now be described in detail with reference to FIGS. 3-10.

Figure 3:
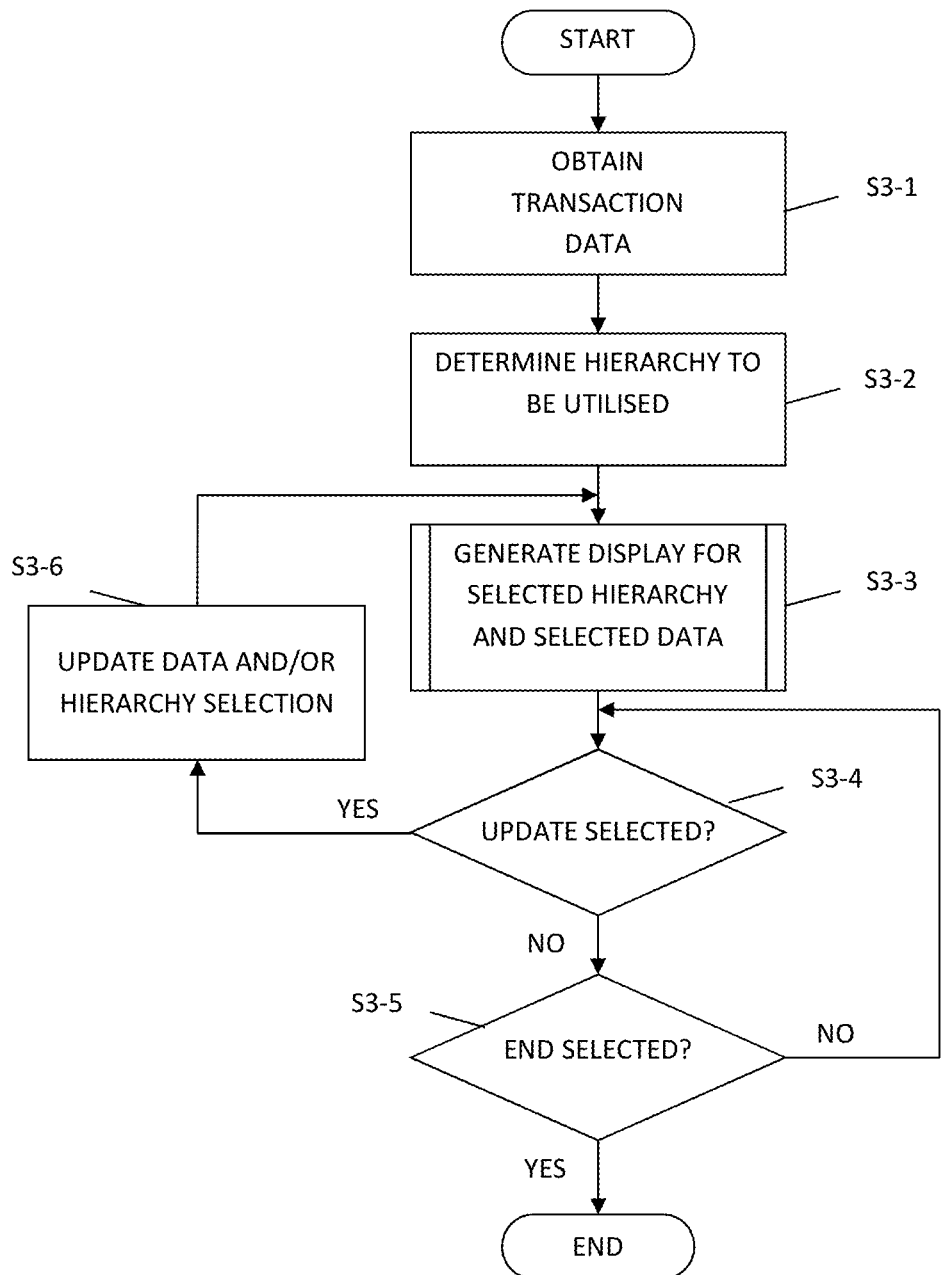
FIG. 3 is a flow diagram of the data processing of the data analysis system of FIG. 1.

Referring to FIG. 3 which is a flow diagram of the processing undertaken by the processing module 11, as an initial step (s3-1), the processing module 11, in response to user input via the keyboard 15 and mouse 17 initially accesses the transactions database 3 to identify transaction records 5 which are to be utilized to generate a display 13. In the case of this initial step the records 5 which are to be displayed can be selected on any basis as determined by the user and indicated to the processing module 11 by user input. Thus for example a user could select a group of records corresponding to a particular time period, location, or transaction type, all of which is recorded either directly or indirectly within the transaction records 5 themselves. Alternatively some indirect measure could be utilized to select the transactions for display such as by processing transaction records 5 to identify sources and/or destinations which for example are associated with an unusually low frequency of transactions or low transaction volumes.

Once the initial dataset has been determined, the processing module 11 then determines (s3-2) in response to user input the hierarchy against which the selected transaction data is to be displayed.

The hierarchy to be utilized could be determined in response to user input selecting a pre-stored hierarchy from a list. One example of such a hierarchy would be a hierarchy based on location of source and/or destination. In such a case the various locations could be grouped by geographic location into countries, regions and sub-regions etc.

Alternatively an artificial hierarchy could be constructed from the available data fields in the transaction records 5 and, when present, the account records 9. Thus for example a user might decide to categorize transaction size (e.g. duration, data volume etc) into a number of ranges and assign this as the top level of the hierarchy, followed for example by groups of mobile phone number prefixes for a second level in the hierarchy, with high level location data being assigned to a third level in the hierarchy.

Any user selected hierarchy could be utilized provided the selected hierarchy enables individual transactions to be assigned both a source location and a destination location within the hierarchy. In the case of a simple geographical hierarchy it will be appreciated that both the source and the destination can utilize the same hierarchy (e.g. country, region sub-region, etc.). In other cases the hierarchies could be utilized where source locations and destination locations are determined using different data sets. All that is required is that the selected hierarchy data is sufficient to enable transaction data to be identified with distinct pairs of items of data.

Having entered or selected the hierarchy to be utilized to order the transaction data to be displayed, the processing module 11 then (s3-3) proceeds to generate a display image for the currently selected data set and organizational hierarchy.

By way of example, if a number of base station transceivers (e.g. masts/antennas) in a particular region of a mobile telecommunications network are affected by a local electrical failure, then this will lead to at least a partial decrease in the number of mobile calls and text messages that are both sent to and sent from those base stations. The visual representations displayed to a user in accordance with the methods and apparatus described herein would enable the user to quickly recognise this pattern of unusually low communication transaction volumes for the affected base station transceivers, and to determine that these base station transceivers are located in the same region. It would therefore be apparent that there is a localised problem that is causing this low volume of communication transactions. Moreover, if the information identifying the base station transceivers is supplemented with information identifying the hub via which they are connected to the electricity supply (e.g. the electrical substation), this factor could be introduced into the hierarchy. Doing so would provide a visual indication that all of the affected transceivers share a common connection to the electricity supply, thereby providing an indication this may be the likely point of failure. For example, if this type of detailed information is not included in the transactions database 3 itself, then the system could be configured with a separate database of supplemental information that could be interrogated as and when the analysis requires supplemental information (e.g. when selected by the user).

The processing undertaken by the processing module 11 to generate display data will now be explained with reference to FIGS. 4-10.

Figure 4:
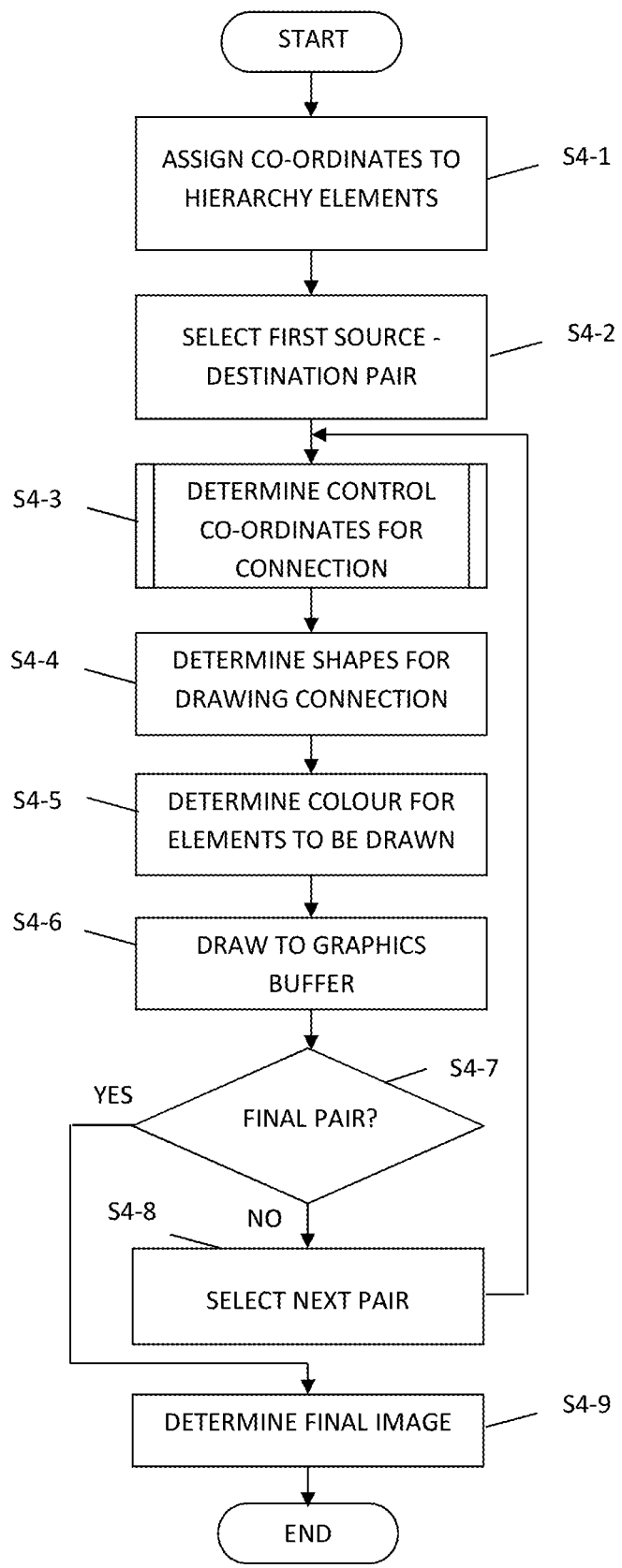
FIG. 4 is a flow diagram of the processing of the data analysis system of FIG. 1 for generating display data.

Turning first to FIG. 4 which is a flow diagram of the processing undertaken by the processing module 11, initially (s4-1) the processing module 11 assigns each of the elements in the hierarchy being used to a screen location.

Figure 5:
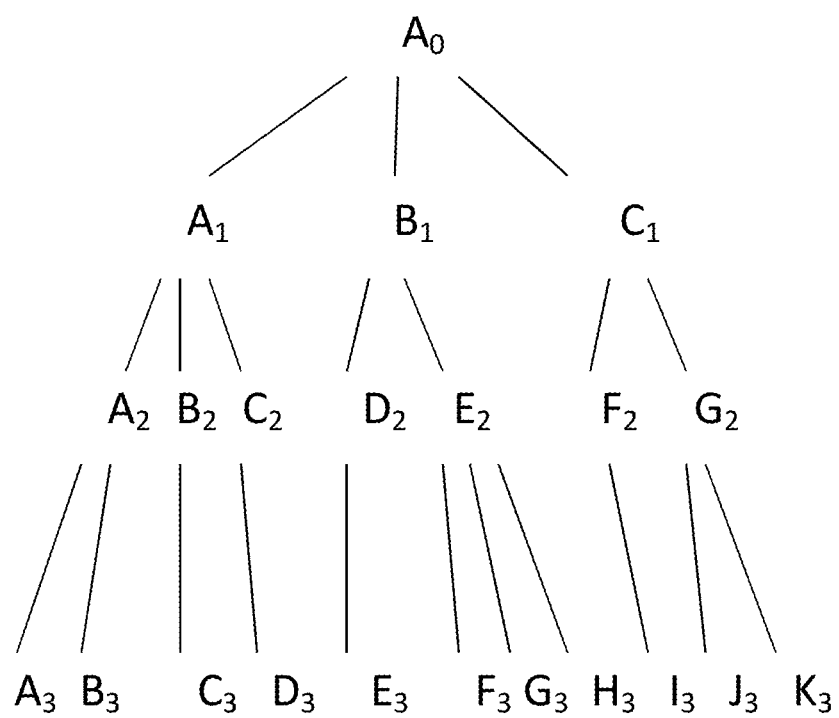
FIG. 5 is a tree diagram illustrating an exemplary hierarchy.

FIG. 5 is a tree diagram illustrating an exemplary hierarchy. In such a tree diagram a route node $A_0$ is provided at the top of the hierarchy. A first set of categories, shown in the figure as $A_1, B_1, C_1$, forms the first level of the hierarchy. The next level of the hierarchy is shown as $A_2, B_2, C_2, D_2, E_2, F_2, G_2$. Finally a third layer of the hierarchy is shown as $A_3, B_3, C_3, D_3, F_3, G_3, H_3, I_3, J_3, K_3$. Thus for example if the hierarchy were to represent geographical location $A_1, B_1, C_1$ might correspond to countries, $A_2, B_2, C_2, D_2, E_2, F_2, G_2$ might correspond to regions and $B_3, C_3, D_3, F_3, G_3, H_3, I_3, J_3, K_3$ might correspond to sub-regions.

Figure 6:
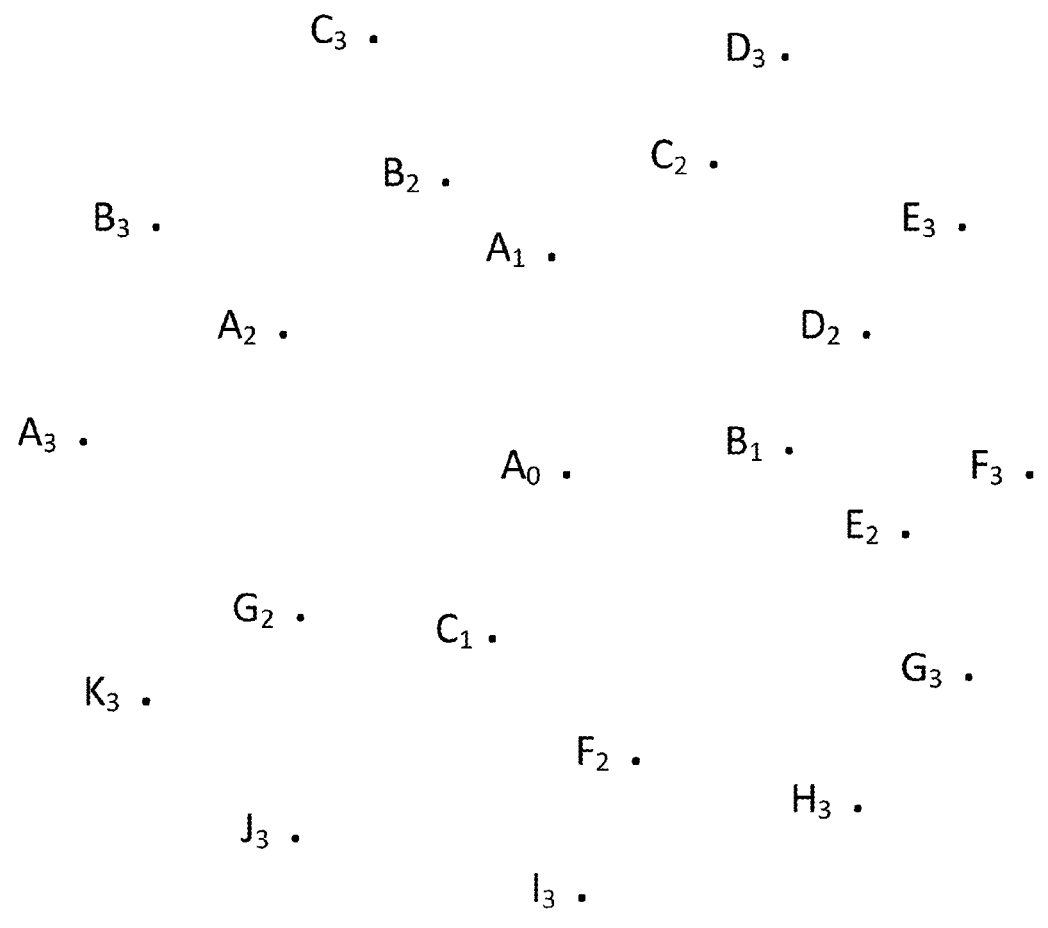

In the present embodiment, once a hierarchy has been identified to the processing module, the various items on the hierarchy are assigned a screen location. FIG. 6 is a schematic diagram illustrating the assignment of co-ordinates to the nodes of the tree diagram of FIG. 5. In FIG. 6 the various nodes of the tree of FIG. 5 have been allocated positions corresponding to a series of concentric circles with the route node $A_0$ placed in the centre and the remaining nodes placed in successive concentric circles about the route node with the nodes at lower levels of the hierarchy shown in sections next to their parent nodes in the higher sections of the hierarchy.

Having assigned a set of co-ordinates for the elements of the hierarchy, the processing module then proceeds to calculate and draw a series of lines representing each of the transactions which is to be plotted. More specifically, first of all an initial transaction to be plotted is selected (s4-2). The processing module then (s4-3) determines a set of control-co-ordinates to represent the transaction. As will be explained these control co-ordinates are selected on the basis of the co-ordinates associated with nodes on the hierarchy and a bundling factor which cause the resultant line curve to a lesser or greater extent so that lines associated with corresponding portions of the hierarchy are shown as being bundled together.

Figure 7:
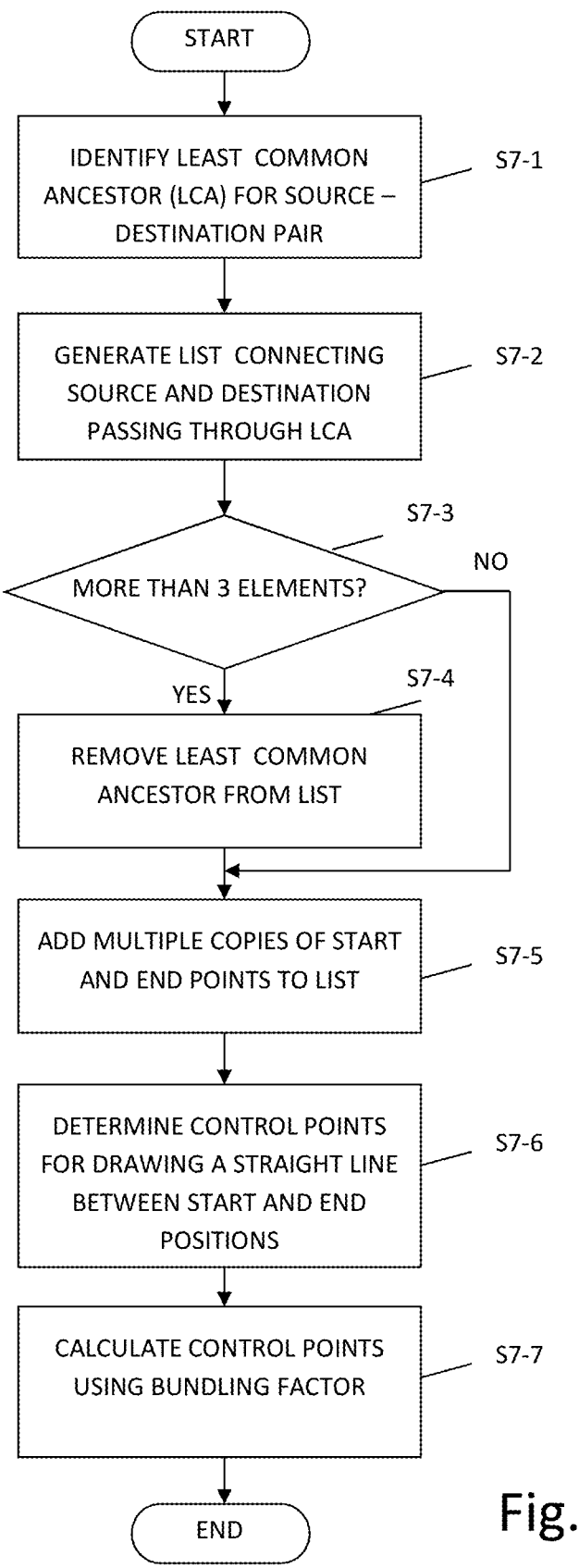
FIG. 7 is a flow diagram of the processing of the data analysis system of FIG. 1 to draw a connection between two positions associated with leaf nodes in an exemplary hierarchy.

FIGS. 7 and 8 are a flow diagram of the processing of the processing module to determine a set of control points and a schematic illustration of a connection between two positions associated with leaf nodes in an exemplary hierarchy.

Referring initially to FIG. 7, having selected a transaction to be illustrated on the display 13, the values for the source and destination associated with a line to be drawn are identified and their relative locations on the selected hierarchy are determined.

Thus for example say a transaction is to be illustrated where the lines are to be drawn connecting positions corresponding to the location of a base station serving the source of the communication transaction and the location of a base station serving the destination of the communication transaction. In such a case, nodes on the hierarchy corresponding to the source base station location and the destination base station location would be identified. The processing module 11 then determines (s7-1) the least common ancestor (LCA) for the two identified locations within the hierarchy being used which connect the nodes corresponding to the source base station location and the destination base station.

Taking the hierarchy of FIG. 5 as an example, in the case of nodes $A_3$ and $D_3$, data corresponding to the hierarchy would be processed to determine that stepping back through the tree the least common ancestor for $A_3$ and $D_3$ would be $A_1$. It will be appreciated that identification of the least common ancestor could be determined using any conventional process for determining the common parent for nodes in a tree structure.

Thus for example if the hierarchy of FIG. 5 were to correspond to geographical locations where location $A_1$, $B_1$, $C_1$ correspond to countries, $A_2$, $B_2$, $C_2$, $D_2$, $E_2$, $F_2$, $G_2$ correspond to regions and $A_3$, $B_3$, $C_3$, $D_3$, $F_3$, $G_3$, $H_3$, $I_3$, $J_3$, $K_3$ correspond to individual towns in the example above it would be determined that the transaction linking a source with an address associated with the town identified by $A_3$ communicated with a destination in another town $D_3$ in a different region but in the same country as $A_3$.

Having identified the least common ancestor for the source and destination points to be illustrated, the processing module 11 then proceeds (s7-2) to generate a list for the path connecting the source node to the destination node which passes via the least common ancestor. This can also be determined using conventional techniques.

Thus in the case of nodes $A_3$ and $D_3$ for the example hierarchy of FIG. 5 the following path data would be determined $A_3, A_2, A_1, C_2, D_3$.

The processing module 11 then (s7-3) proceeds to determine whether the generated list contains more than three elements. If this is not the case, this will mean that the nodes associated with the transaction to be illustrated share the same parent node. In this case the list of nodes is left unamended. If, however the path data contains more than three elements, in this embodiment the reference to the closest least common ancestor is removed (s7-4) from the list.

Thus in the case of the path data $A_3, A_2, A_1, C_2, D_3$ and the hierarchy of FIG. 5, the path data would be modified to become $A_3, A_2, C_2, D_3$. In contrast where path data for say data associated with nodes $A_3$ and $B_3$ were to be determined, here the least common ancestor would be identified as being node $A_2$ and path data for connecting nodes $A_3$ and $B_3$ would be generated as $A_3, A_2, B_3$. In such a case as the path data includes only three elements no modification of the path data would be made and the generated path data would remain as $A_3, A_2, B_3$.

After having removed the reference to the least common ancestor from path data containing more than three elements, the path data is then (s7-5) modified by appending three copies of the first and last elements in the list to the beginning and end of the list respectively.

Thus for example in the case of path data comprising the following list $A_3, A_2, C_2, D_3$, the list would be modified to become $A_3, A_3, A_3, A_3, A_2, C_2, D_3, D_3, D_3, D_3$.

At this stage, the co-ordinates associated with the elements in the list of path data will define a first set of control points for drawing a line comprising appended b-slines to connect the positions at the beginning and end of the list. Such a curve will bend towards the various control points associated with nodes at different levels of the hierarchy and hence bend towards the co-ordinates of the various positions associated with elements of the hierarchy being utilized such as is illustrated in FIG. 6.

Merely drawing a line based on the co-ordinate positions associated with the elements in the data path would only enable a connection between two points to be drawn in a single way and would not enable a user to vary the extent to which lines deviate towards the various control points. The ability to vary the extent to which lines representing transactions deviate is advantageous as stronger deviation enables connections associated with shared higher elements in the hierarchy to be grouped together which facilitates the selection of transactions for greater scrutiny.

Figure 8A:
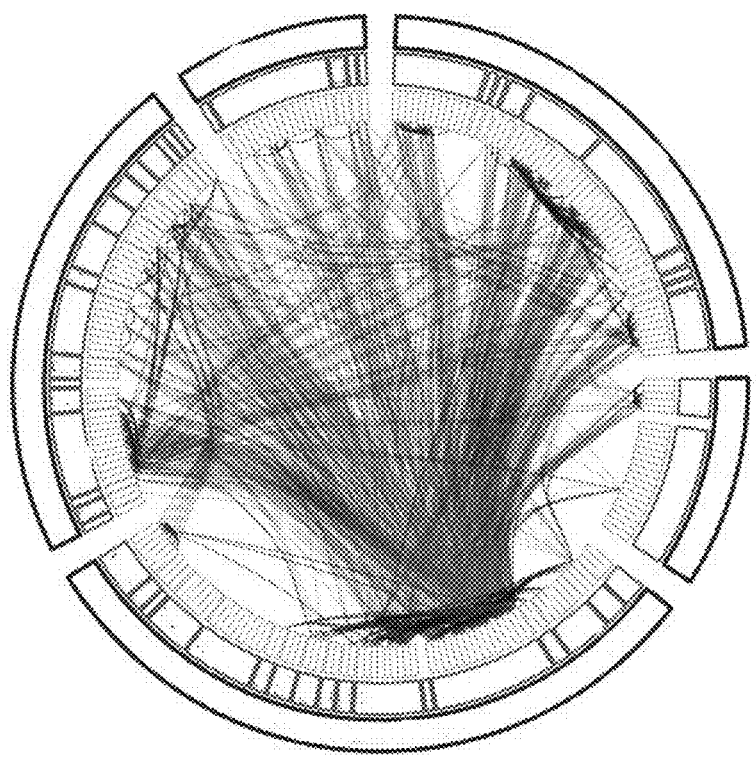
FIG. 8A and FIG. 8B are schematic illustrations of the manner in which the illustration of connections between a plurality of points can be varied in dependence upon a bundling factor.
Figure 8B:
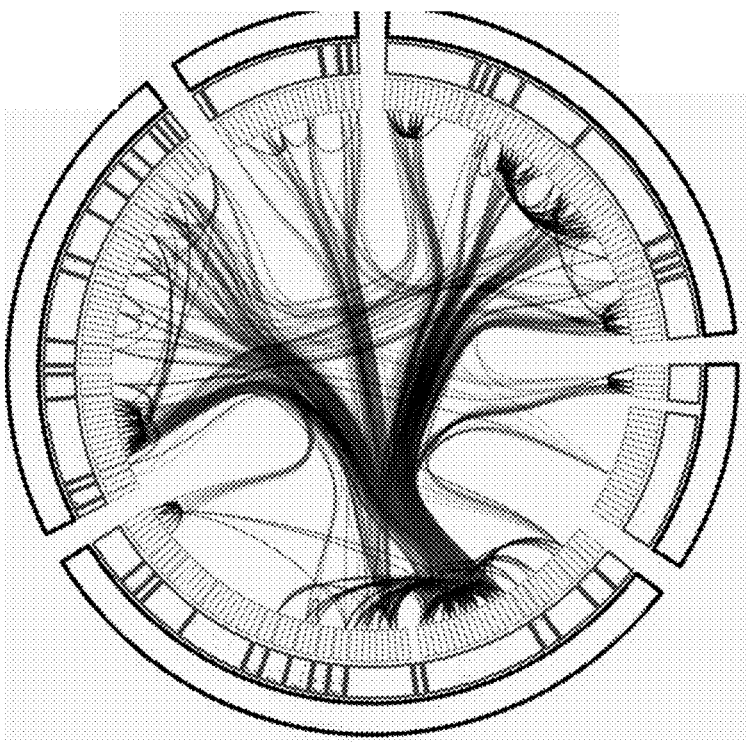

This is illustrated by FIG. 8A and FIG. 8B which are schematic illustrations of the manner in which the illustration of connections between a plurality of points can be varied in dependence upon a bundling factor. In FIG. 8A transactions associated with shared elements in the upper portions of the hierarchy are shown by lines which deviate less than in FIG. 8B. As can be seen by inspecting FIGS. 8A and 8B, this means that the extent to which transactions share such upper elements in the hierarchy is less clear in FIG. 8A compared with FIG. 8B. This is achieved by bundling the representations more closely together in the central portions of the figures.

Bundling of lines is also used to free up screen space so structure and patterns can become visible and more easily detected and recognized by the user. The bundling operation is essential as the display mentioned in this embodiment can hold very large numbers of lines each representing a set of transactions. Display real estate (pixels) does not allow such a quantity of lines to be presented on the display screen in a single instance; rather the lines are displayed in a (virtual) overlay mode. Long before the physical limits of the computer display are reached a user will no longer be able to easily identify individual line(s) of interest, instead the human eye and brain only perceive clutter as shown in FIG. 8A. The bundling as shown in FIG. 8B provides structure to the image for better human perception and comprehension and helps the user identify the flow of transactions. In case the user wishes to see details of sub-sets or even individual transactions the user can move his mouse to the perimeter of the line view and by hovering over the lines is able to highlight these while the other lines are faded into the background. To render individual lines visible the system allows for dynamic interrogation of parts of the display that renders the data set, as a zoom-in function.

In order to provide the ability to vary the extent to which lines representing transactions are bundled together, having determined path data identifying a first set of control points corresponding to the co-ordinates associated with the list of path data, the processing module 11 then (s7-6) proceeds to determine an alternative set of control points for drawing a straight line between the end points of the line defined by the first set of control points.

Figure 9:
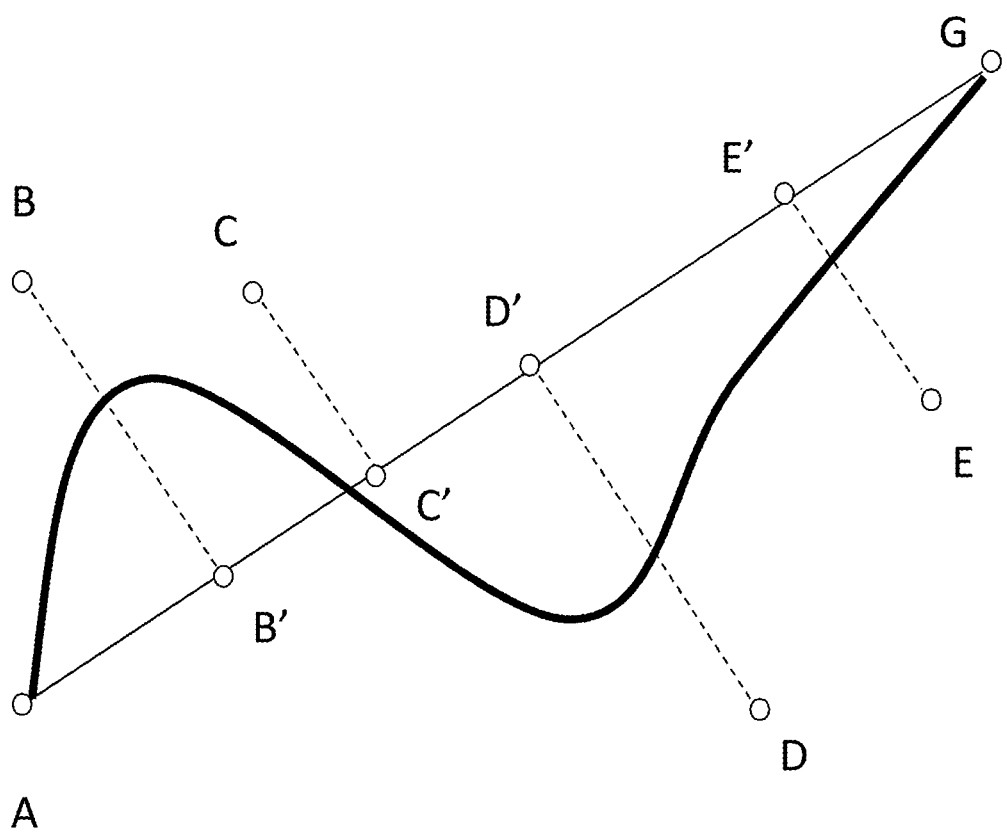
FIG. 9 is a schematic illustration of a connection between two positions associated with leaf nodes in an exemplary hierarchy.

FIG. 9 is a schematic illustration of a connection between two positions labeled A and G connected by a curve shown by a thick line in FIG. 9. The curve comprises a set of appended b-splines defined by control points A, B, C, D, E, F, G.

An alternative connection between the two positions A and G would be a straight line between those two points. Such a line can also be represented by a set of appended b-splines where the control points for such b-splines have co-ordinates which lie along the line connecting A and G.

An alternative set of control points for a straight line connection can be derived from the co-ordinates associated with positions A and G and then selecting a number of points on the line. In this embodiment the alternative control points B', C', D' and E' are determined by calculating the positions on the line A-G nearest to the positions of the control points B, C, D and E respectively.

Control points for a line connecting A and G which curves to a lesser or greater extent can then be determined (s7-7) by using a weighted average of the co-ordinates associated with the original and the alternative control points. That is to say control points for drawing a connection between A and G can be selected to be at positions along any of the dotted lines shown in FIG. 9 connecting B and B', C and C', D and D' and E and E'. The control points for such lines can be calculated using the following equation:

Control point co-ordinates=(1−B)*(original co-ordinates+B(alternative co-ordinates)

where B is the selected bundling factor to be utilized.

If a bundling factor of 1 is selected the curved lines will utilize the original co-ordinate positions as control points whereas if a bundling factor of 0 is selected connections will be represented by straight lines connecting the start and end points.

Overlapping groups of four of the set of generated control points can then be used to draw a line between the positions associated with the source and destination elements. More specifically each set of four control points can be utilized as control points for a cubic b-spline with the entire line connecting the source and destination elements being the piece wise cubic b spline formed by the concatenation of these individual b-splines Returning to FIG. 4 having determined a set of control points for representing a transaction as a b-spline connecting two positions corresponding to the source and destination for the transaction, the processing module 11 then proceeds to determine a set of shapes (s4-4) for drawing the each b-spline using the control points.

Mathematically a b-spline is fully defined based solely on the co-ordinates associated with a set of control points. When rendering a b-spline as an image, it is necessary to break the mathematical curve which is to be drawn into a set of shapes which can be rendered by the computer. This is necessary because in order to be rendered the curve must be given a thickness so that the rendering of the curve can be seen.

Figure 10:
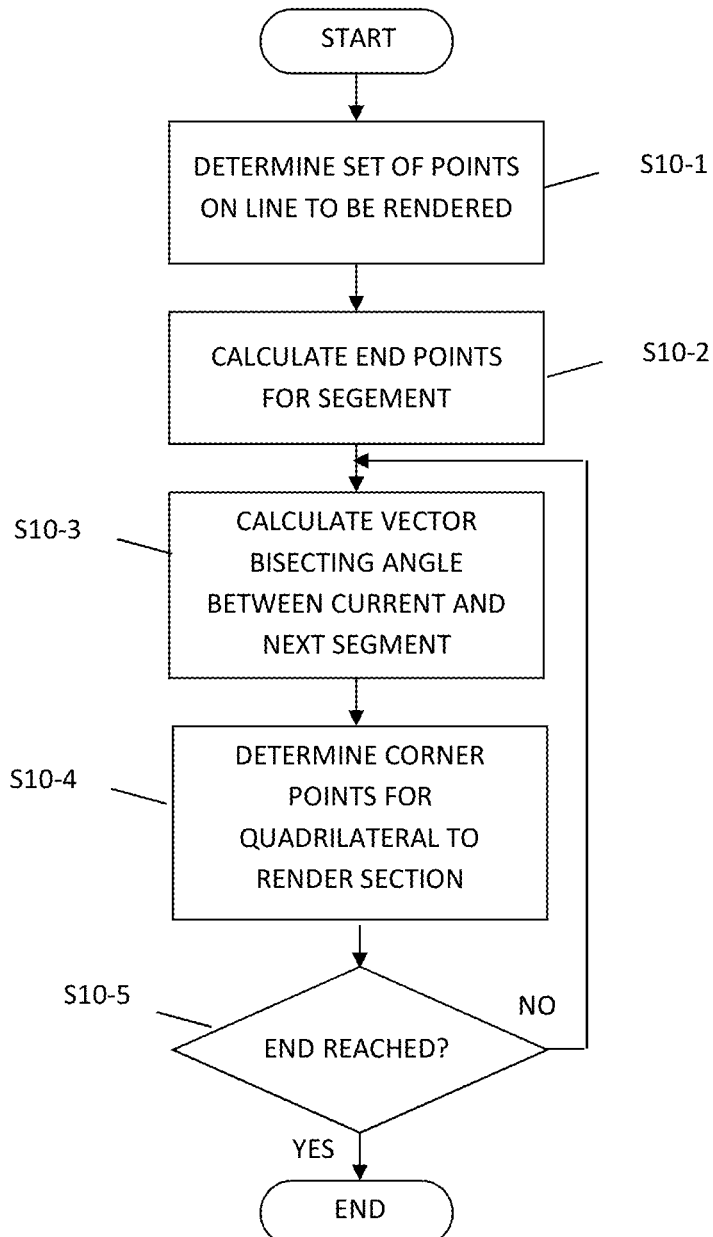
FIG. 10 is a flow diagram of the processing undertaken to determine a set of shapes to represent a curve.

The processing to determine such a representation will now be described with reference to FIGS. 10 and 11 which are a flow diagram of the processing of the processing module 11 and an illustrative section of a curve to be rendered To achieve such a rendering, initially (s10-1) a set of points on the line to be rendered is determined. The co-ordinates for the points can be determined directly by processing the control co-ordinates for the b-spline for the curve to be rendered. These will comprise a set of points all of which should lie at the middle of the curve which is to be rendered.

Figure 11:
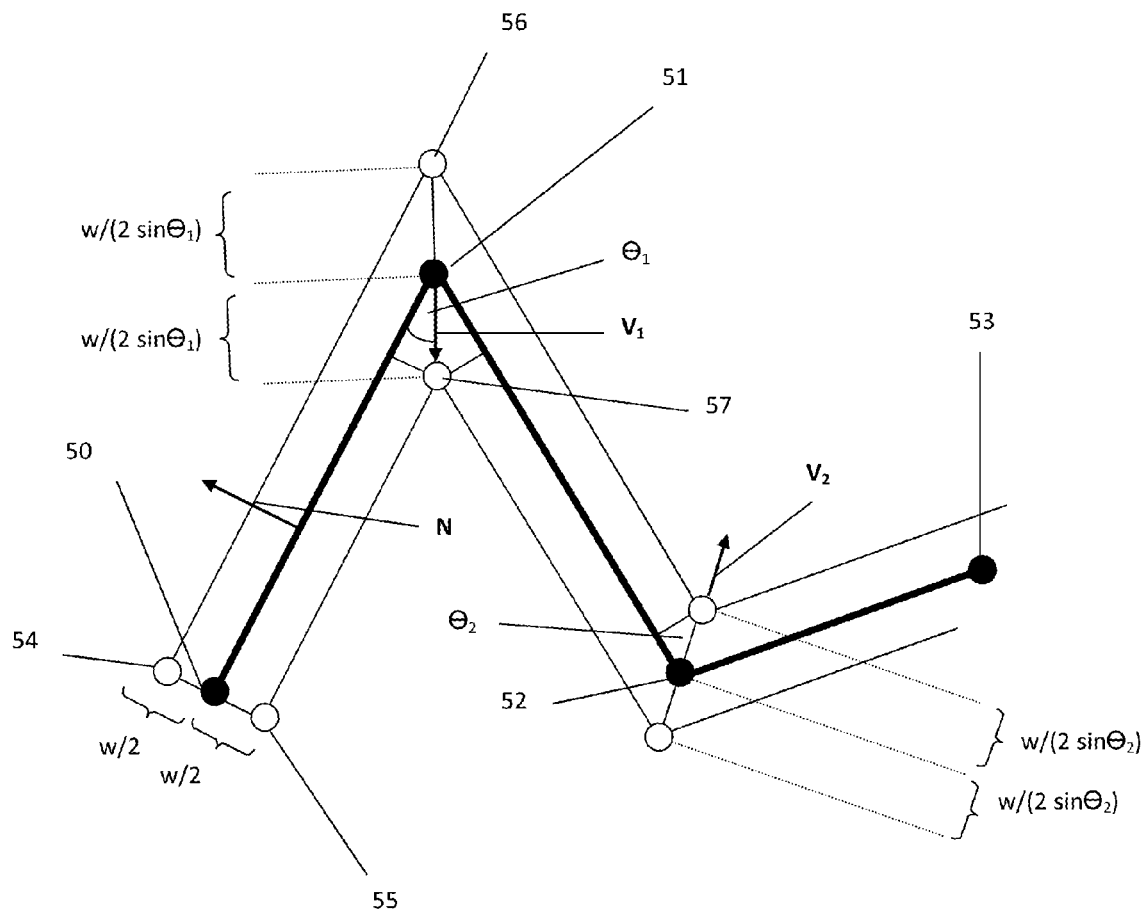
FIG. 11 is an illustrative section of a curve to be rendered.

FIG. 11 is an illustrative section of a curve to be rendered. In the illustration the points 50,51,52,53 lying on the thick black line comprise points mathematically determined to correspond to the portion of the line to be rendered.

Starting with the first point 50, the processing module then (s10-2) determines co-ordinates for the edge of the line at that point. This is achieved by determining normal (N) to a vector connecting the first 50 and second 51 points on the line a length of ±w/2 from the first point 50 and assigning these co-ordinates to the corners 54,55 of the beginning of the line to be rendered. In this way two co-ordinates 54,55 separated by a distance w corresponding to the selected width of the line to be rendered are identified where the first selected point 50 lies in the middle of the two points 54,55.

Having determined the initial end points 54, 55, the processing module 11 then proceeds to calculate (s10-3) a unit vector ($V_1$) which bisects the angle formed by lines connecting the first 50 and second 51 and the second 51 and third points 52 which lie on the mathematical line being rendered.

Co-ordinates for the quadrilateral representing an initial section of the curve are then (s10-4) determined by identifying points 56, 57 a distance ±w/(2 sin $\Theta_1$)$V_1$ from the second point 51 lying on the mathematical curve being rendered where $\Theta_1$ is the angle between the line connecting the first and second points 51 on the curve being rendered and the vector $V_1$.

Having calculated co-ordinates for the quadrilateral for rendering the first section, the processing module 11 then checks (s10-5) to see if the complete line has now been rendered.

If this is not the case the processing module 11 then proceeds to calculate (s10-3) a vector bisecting lines connecting the next two pairs of point on the mathematical curve being rendered. Thus having processed the first 50, second 51 and third 52 points on the line the processing module 11 will then determine a vector $V_2$ bisecting the lines connecting the second 51 and third 52 and the third 52 and fourth 53 points on the curve being rendered.

Once this vector has been determined, the end points for the next quadrilateral for representing the next section of the curve is then (s10-4) determined utilizing the vector $V_2$ and the angle between the lines connecting the second 51 and third 52 and the third 52 and fourth 53 points on the curve being rendered $\Theta_2$ bisected by the vector $V_2$. After which the processing module 11 once again checks (s10-5) whether the end of the curve being rendered has been reached.

Returning to FIG. 4, having determined a set of quadrilaterals to represent the line connecting the positions corresponding to the source and destination for a transaction, the processing module then (s4-5) determines a coloring for the line.

The coloring for the line can be determined in a number of different ways, depending on what information a user wishes to highlight. If so selected by a user, the processing module 11 may be arranged to render lines which vary in color say from red to green to enable a user to distinguish the source and destination for a represented transaction. In such a case the determination for the coloring of the line segments would be made where the color assigned to a portion of a line was dependent upon the portions position on the line.

Alternatively, the processing module 11 could be arranged to color code the transactions based on some other factor. For example different colors could be assigned to transactions depending upon the timing of the transactions, the size of the transactions or the frequency with which particular transactions were made. Such a coloring would then enable a user to identify transactions sharing certain criteria for further analysis.

Having determined the coloring to be used to color the line representing a transaction, the processing module 11 then (s4-6) renders the line to the graphics buffer 14 using standard open GL techniques.

When rendering different lines corresponding to different transactions the lines could be rendered in order with earlier rendered lines being overwritten by later rendered lines. However where lines are colored to indicate additional information about transactions it is preferable that when the renderings of different transactions are combined the processing module 11 determines maximum color values for any particular position based on the rendering. Such an approach has the benefit of highlighting lines which differ from most transactions and hence make outliers more apparent.

Having rendered the currently selected transaction as a line on the display, the processing module 11 then determines (s4-7) whether the final transaction has been reached. If this is not the case the next transaction is selected (s4-8) and processed (s4-3-s4-5) and rendered (s4-6) to the graphics buffer 14 before the processing module checks (s4-7) once again whether the final transaction has been reached.

When the final transaction has been processed the processing module 11 then can cause the image stored in the graphics buffer 14 to be displayed (s4-9).

In some embodiments it may be preferable to modify the content of the graphics buffer 14 before display. In particular where lines representing transactions are rendered by determining maximum color values for particular channels at points of overlap between lines representing different transactions, the processing module 11 may proceed to modify the color values to mimic some kind of alpha blending for the representation.

As noted above where lines are rendered which overlap one another one approach to deal with such areas is merely to utilize the final overwrite and display that information on the screen. Another approach would be to take an alpha blend of the multiple representations. This would cause areas of overlap to appear darker and hence would provide a user with information about the numbers of transactions in an area of overlap. However utilizing an alpha blend approach averages out color representations and hence where a transaction differs in appearance from the majority of transactions shown in a particular portion of the screen that difference may not be apparent because the single outlier transaction will have a very limited influence on the average appearance of the area of overlap.

It is for this reason that it can be preferable to render areas of overlap utilizing maximum color values. In this way if say for example the majority of transactions in a portion of the screen were to be rendered green and an outlier transaction were to be rendered red the existence of the outlier transaction would still be apparent on the screen.

A disadvantage with such an approach is that utilizing maximum color values to represent areas of overlap rather than utilizing alpha blending results in images where the number of times an area is overwritten is not apparent. Thus by utilizing just the maximum color values for a position it ceases to be possible to identify the numbers of transactions rendered in a particular area of the screen.

A compromise approach, can however, be achieved which enables outlier transactions to be highlighted and for the numbers of transactions rendered in a particular area to be made apparent. This is to render areas of overlap selecting maximum color values and then to combine the results with a re-rendering of the lines in solid color (i.e. black or white) using alpha blending. The re-rendering in solid color then provides data as to how the maximum color values should be altered to account for the numbers of lines overlapping at a particular position.

Alternatively, the coloring of lines could be determined in other ways. Frequently it will be desirable that the full range of colors or shades should be utilized to represent lines on an image. In such embodiments the extent of over-writing of particular points on the screen could be determined and the coloring scaled so that the most and least over-written portions of the screen are mapped to the lightest and darkest colors with intermediate portions of the screen being mapped to intermediate colors. In such embodiments the mapping of intermediate portions of the screen could be linear. However in some embodiments some kind of non-linear mapping may be preferable. Suitable non-linear color mappings could include for example a logarithmic or exponential mapping. Using non-linear mappings may be preferable as they would enable outlier values to be more clearly represented.

When a representation of the selected transactions has been rendered and displayed on the screen a user can then input selections via the keyboard 15 and mouse 17 to vary the display.

Typically the user input will instruct the processing module 11 to re-render the display based on an alternative selection of transactions, attributes belonging either to transactions or elements, hierarchy and/or rendering.

FIGS. 12-16 are illustrative screen displays of the above described system in use for analyzing transaction data relating to mobile telecommunications transactions.

Figure 12:
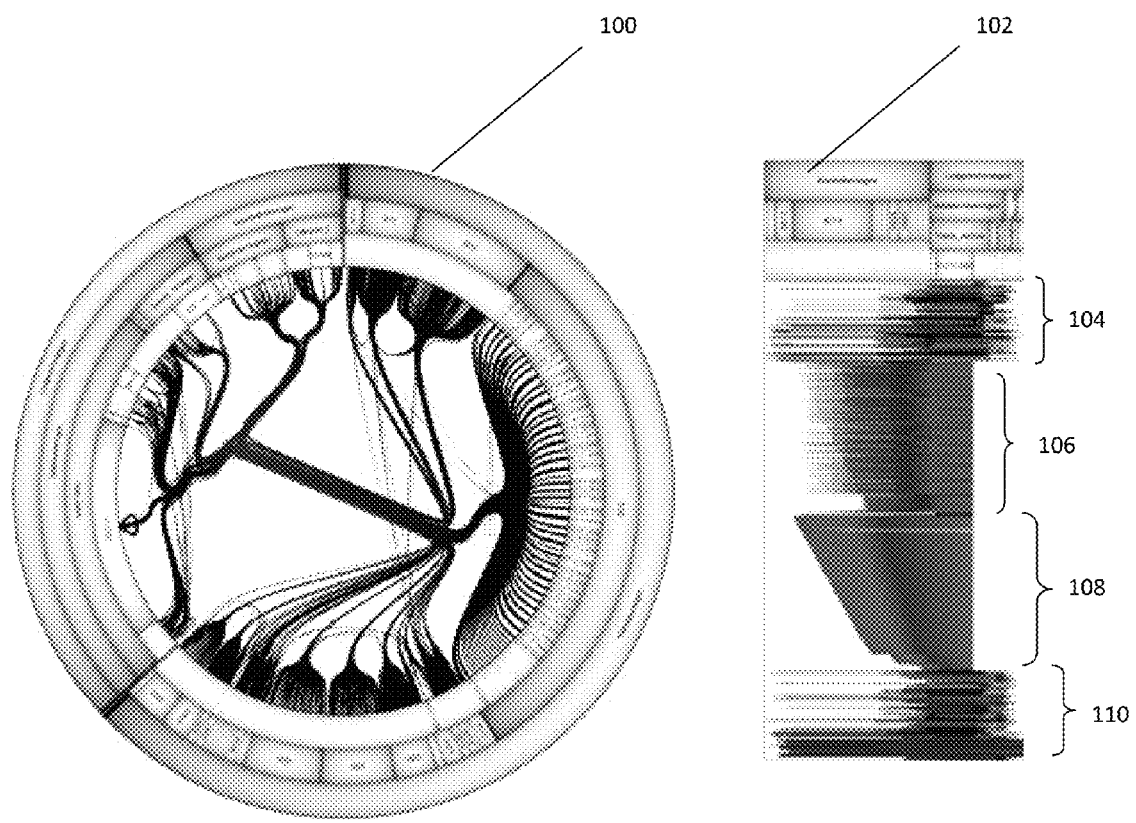
FIG. 12 is an illustrative screen display of the above described system in use for analyzing transaction data relating to bookkeeping entries and bank transactions.

As shown in FIG. 12, in this example the screen display is shown as being in two parts. A first section 100 in which transactions are shown as lines connecting sources and destinations arranged in a circle and a second section 102 where transactions are shown as straight lines arranged in order of time or sequence associated with the transactions.

In this example the hierarchy used comprises geographical locations associated with base station transceivers. In the figures in the first section 100 of the screen the individual base station locations are shown. In the second section 102 of the screen the hierarchy used is shown above the lines representing transactions. In this section of the screen the individual lines extend between points corresponding to the sources and destinations of transactions.

In both the first and the second sections 100,102 lines corresponding to transactions are shaded to indicate (a) selected attribute(s), for example direction from source to destination, or age of the flow of the transaction. In embodiments this may be best shown using color. FIG. 12 shows an illustration of 8777 lines corresponding to transactions in both of the sections 100,102 of the screen.

The illustration of transaction data in the manner shown in FIG. 12 facilitates user investigation and manipulation of the transaction data. In particular the first section 100 of the screen using the selected hierarchy illustrates communications flowing between source and destination base stations. Whereas the second section 102 provides a user with information relating to the timing of individual transactions. The ordering of the lines in the second section 102 could be based either on an identifier or some other data associated with each individual base station transceiver or on the basis of time data associated with transactions. The display may include a representation of a scale to identify the range of transactions being displayed. Thus for example an indication of a range of base station transceivers or a range of dates or times might be displayed.

Using the keyboard 15 or the mouse 17, a user can then drill down within the available information to investigate further.

Thus for example a user might input criteria for selecting transactions limited to a certain time period, size or frequency to be displayed and only transactions meeting such criteria would then be extracted from the transactions database 3 for display on the screen. The screen display 13 could be arranged to display user selectable menus to facilitate such selection or entry of data indicating the selection criteria to be used.

Alternatively a subset of the displayed transactions could be made by identifying a section of the screen using a pointer under the control of the mouse 17. In such a case it would be necessary to identify which transactions resulted in the rendering of display data to a particular section of screen. This could be achieved by checking the display data rendered to the graphics buffer 14 which was utilized to render a particular display.

A problem with such an approach arises where transactions are selected by drawing a line on the screen to identify transactions to be investigated. This is because it is possible that the line will not intersect with pixels which are rendered. This is particularly a problem where an oblique line is drawn as it is possible that a rendering of an oblique line will pass through another line at a different angle without there being any pixels in common. Such a problem can be avoided by utilizing the identification of a line with a pointer to define a box of a number of pixels thicknesses and identify renderings which occur anywhere in that box. However this can result in too many transactions being identified as being of interest.

An alternative approach would, however, be to utilize the drawing of a line to identify an angle and re-render a representation of the current display in the graphics buffer 14 without updating the display where the rendering applied a rotation to the display based on the angle of the line. This would then ensure that the selected line corresponds to a row or column of pixels in the re-rendered image. In such a case any renderings of transactions which correspond to the selected portion of the row or column could be reliably identified.

In the case of the transactions shown in FIG. 12, it is apparent from the Figure that the transactions shown in the second section 102 of the screen naturally form 4 blocks 104-110.

Figure 13:
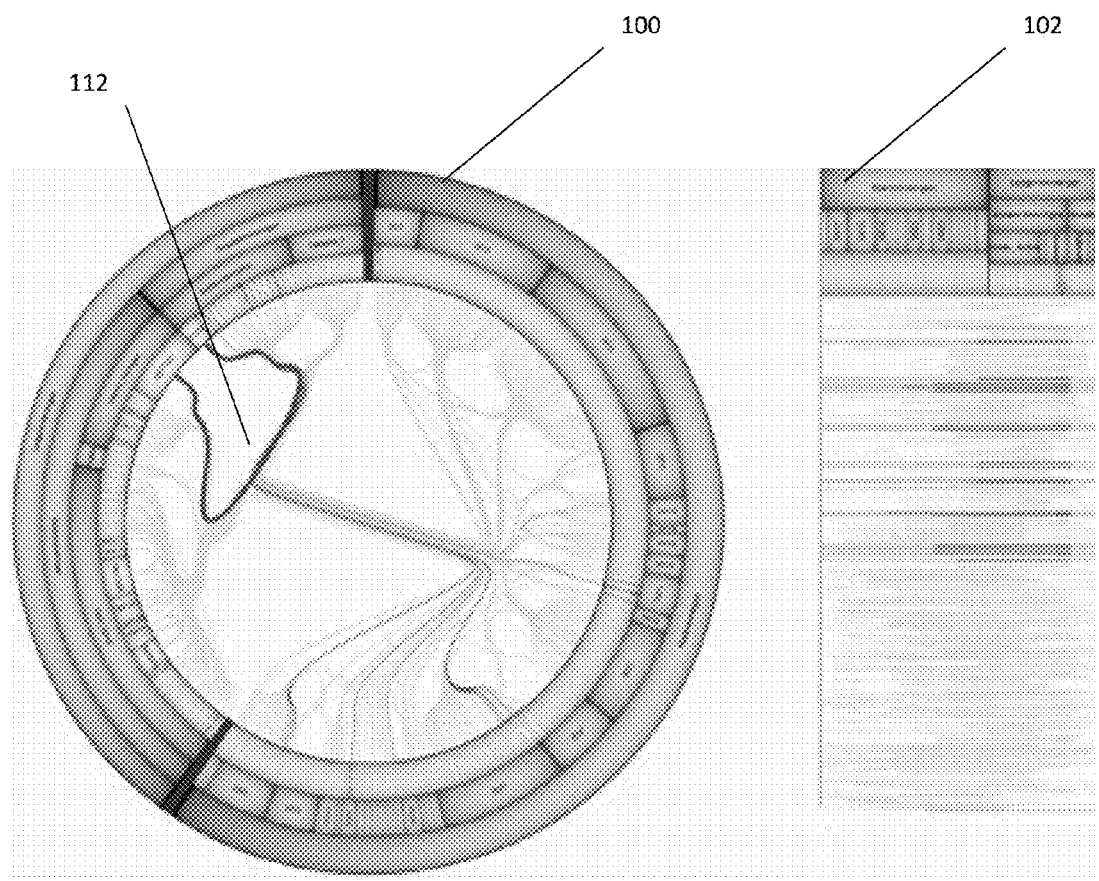
FIG. 13 is an illustrative screen display of the above described system in use for analyzing transaction data relating to bookkeeping entries and bank transactions.

FIG. 13 is an illustration of how the screen would be updated if the first 104 of the blocks 104-110 in FIG. 12 were to be selected for display. This would restrict reduce the numbers of transactions to be illustrated from 8777 to 1499. Reviewing the content of the display shown in FIG. 13 would then reveal in this example that the block consisted mainly of corresponding communication transactions between a particular pair of base stations with the greatest numbers of transactions shown by the thickest bundles of lines 112.

Figure 14:
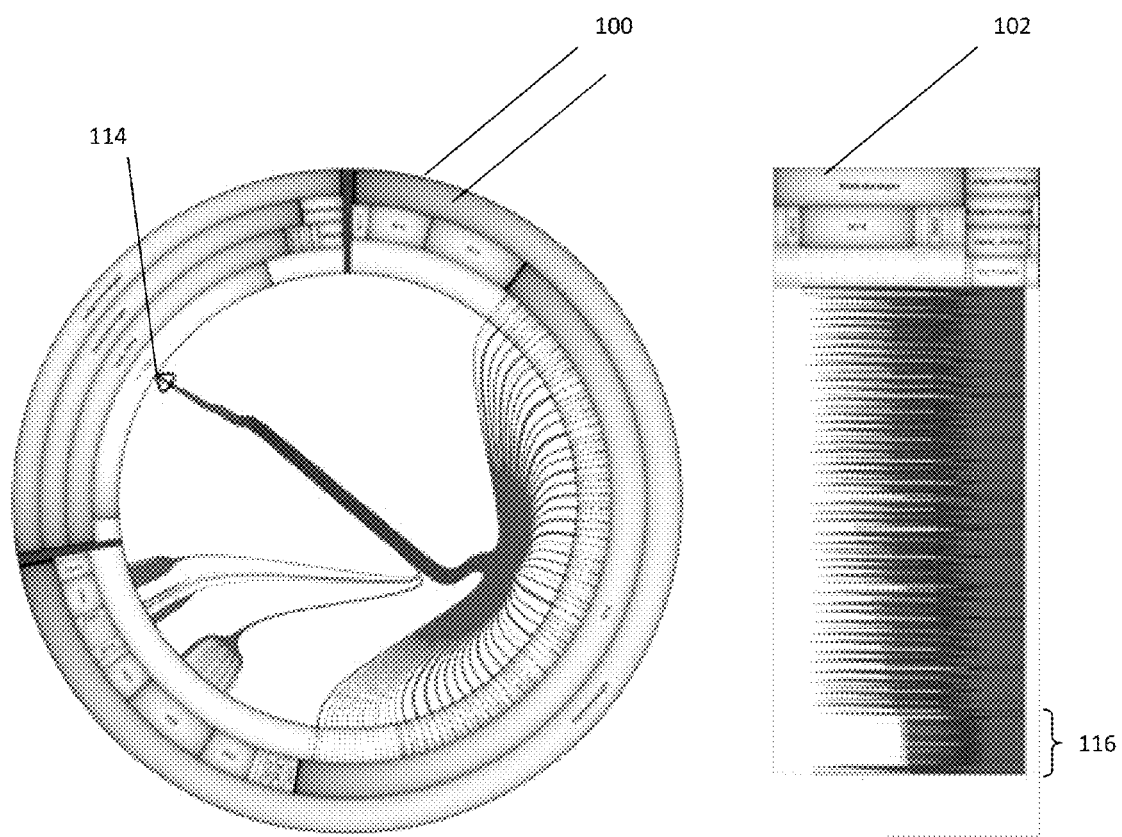
FIG. 14 is an illustrative screen display of the above described system in use for analyzing transaction data relating to bookkeeping entries and bank transactions.

FIG. 14 is an illustration of how the screen would be updated if the second 104 of the blocks 104 -110 in FIG. 12 were to be selected for display. This would cause a different set of transactions to be highlighted.

As is shown in FIG. 14, when restricting the rendering of transactions just to transactions in this block, a further subdivision 116 of the transactions becomes apparent in the second 102 section of the display.

Figure 15:
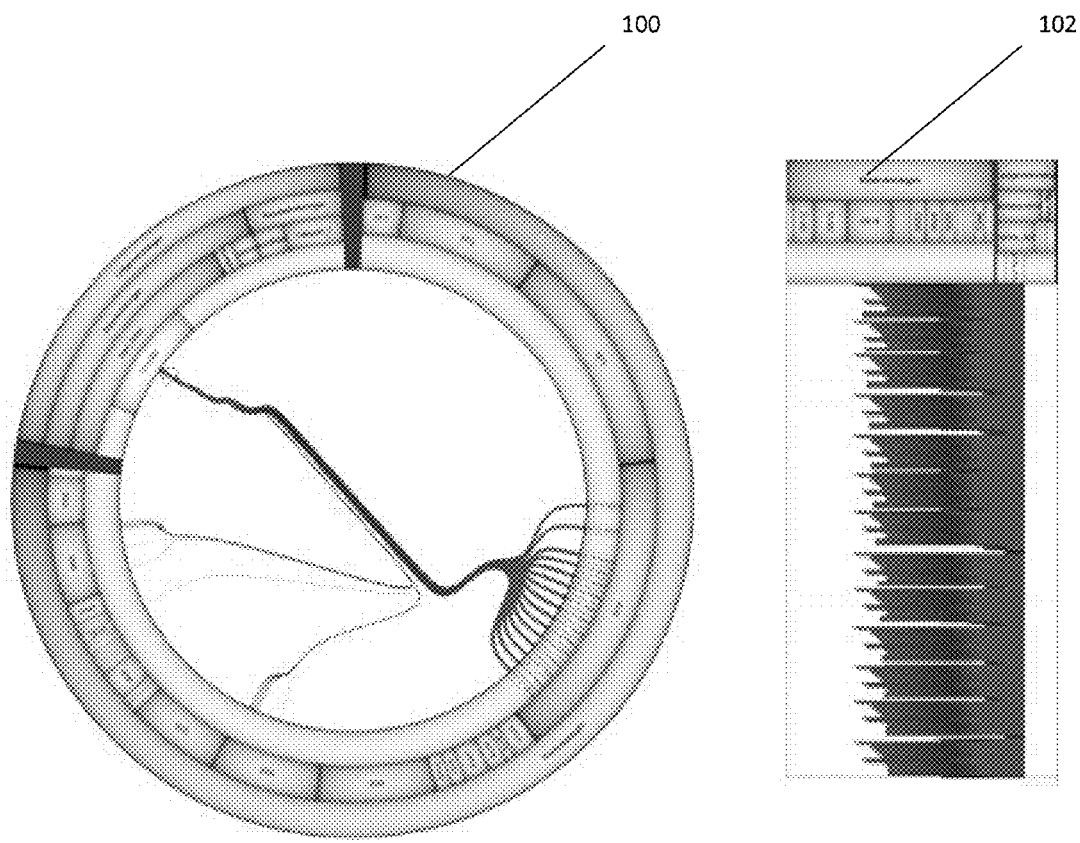
FIG. 15 is an illustrative screen display of the above described system in use for analyzing transaction data relating to bookkeeping entries and bank transactions.

In a similar way this subdivision can be selected and the results displayed. The results of making such a selection are illustrated in FIG. 15

Illustrating communication transaction data makes unusual patterns of data more apparent to a user. A number of such unusual patterns are illustrated in FIG. 16.

Figure 16:
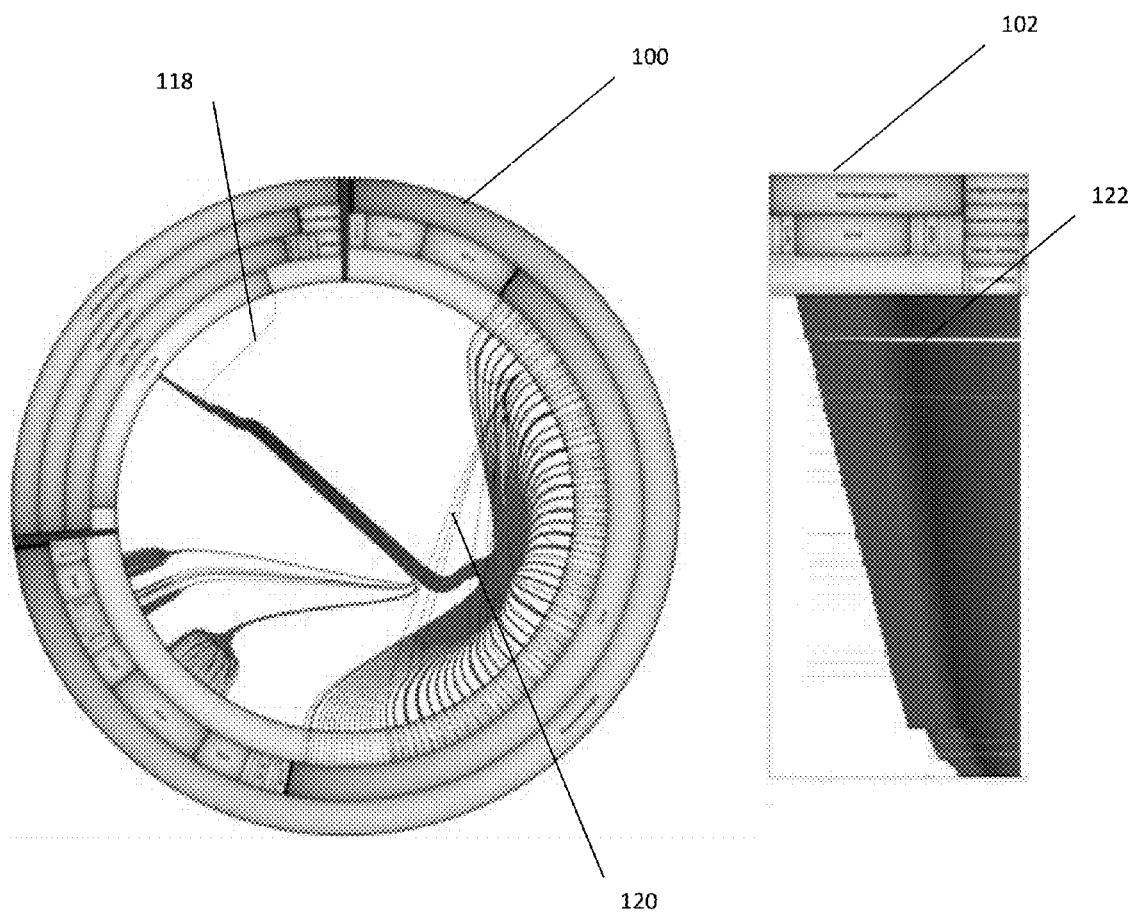
FIG. 16 is an illustrative screen display of the above described system in use for analyzing transaction data relating to bookkeeping entries and bank transactions.

FIG. 16 which is an illustration of the results of restricting the transactions of FIG. 12 to the third block of transactions 108. However in contrast to FIG. 14 where all the transactions have a common origin, in FIG. 16 one of the transactions 118 is shown as being connected to a different origin base station and a number of the transactions 120 are shown as having both a different source and a different destination. Additionally in FIG. 16, a group of transactions 122 is apparent in the second section 102 of the screen which might require additional investigation.

Any such transactions may potentially be due to a fault and hence warrant further investigation and to facilitate such investigations, selection of such individual or groups of transactions could cause additional information about such transactions to be displayed.

In addition to selecting groups of transactions for further investigation and other means for selecting subsets of transactions to be viewed could also be provided. A user might be able to select portions of the hierarchy and eliminate them from the transactions being considered. In such an example any transactions relating to the excluded portions of the hierarchy would not be rendered. Additionally, the processing module 11 could be arranged to reassign co-ordinate positions to the remaining portions of the hierarchy to enable the remaining transactions to be better distinguished.

An additional way to facilitate investigation and selection of transactions would be to enable the processing module 11 to be responsive to user input to alter the bundling factor to be utilized to render an image. As shown in FIGS. 8A and 8B varying the bundling factor varies the extent to which transactions sharing higher elements in the hierarchy are grouped together. This would then facilitate on-screen selection of such groups of transactions.

A further way in which the display could be altered would be for the processing module 11 to be responsive to user input to alter the co-ordinates associated with the selected hierarchy. Thus for example instead of associating elements in a hierarchy with positions arranged in a series of concentric circles such as is illustrated in FIG. 6, hierarchy elements could be arranged in a series of lines. Such an arrangement would be particularly suitable when analyzing data where the source and destination data for transactions was to be analyzed against different hierarchies.

Another alternative would be to alter the rules for coloring images to for example color lines based on a time ordering rather than in a manner to distinguish between sources and destinations.

In the previous examples transaction data has been illustrated as being rendered as a set of connections between points arranged around the perimeter of a circle. It will be appreciated that the arrangement of transactions is determined by the assignment of co-ordinates to control points for drawing lines and hence by the assignment of co-ordinates to elements in the hierarchy being used.

Figure 17:
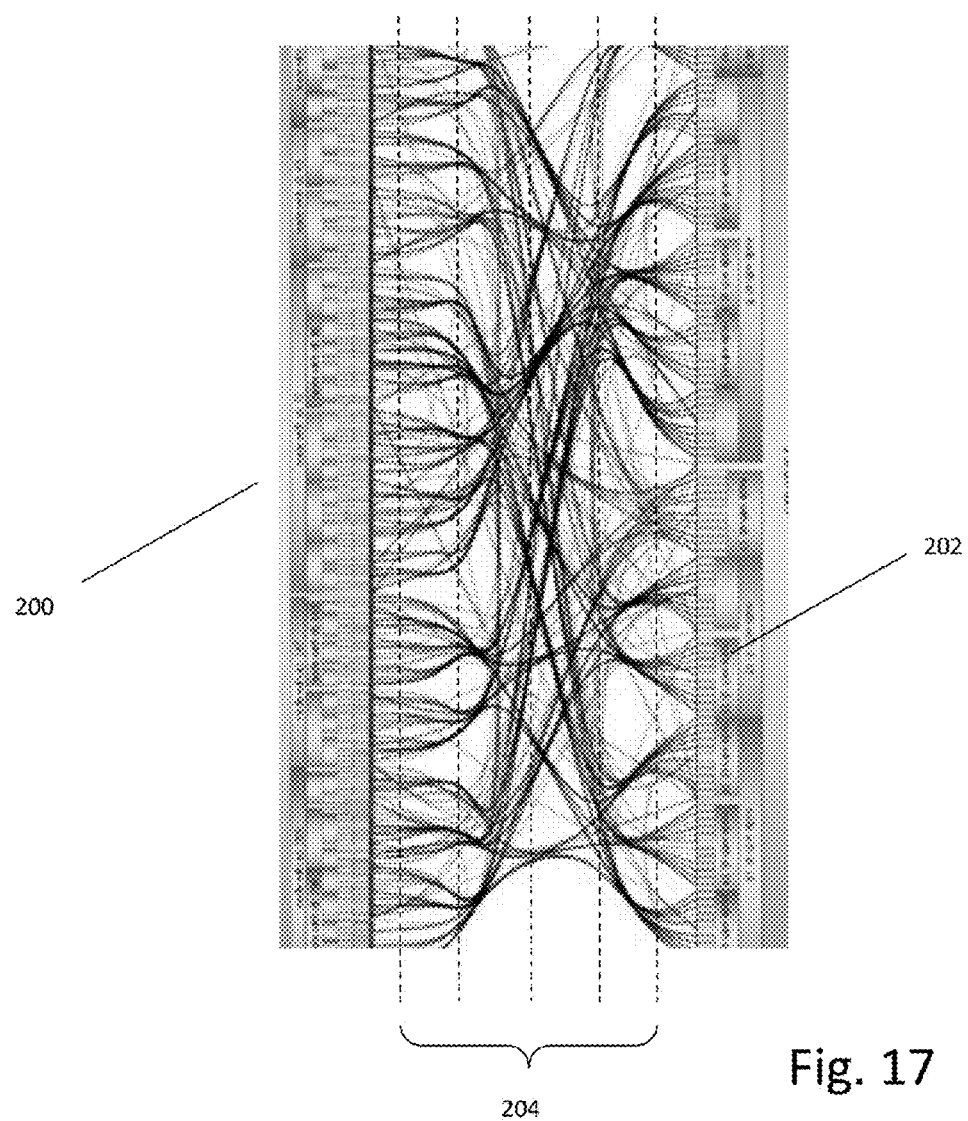
FIG. 17 is an illustrative screen display of a set of transactions rendered using a set of co-ordinates assigned to hierarchy members where such co-ordinates are arranged in a series of straight lines.

Instead of assigning a set of co-ordinates to elements in a hierarchy arranged in a series of concentric circles, an alternative approach would be to arrange such co-ordinates to lie in a series of straight lines. FIG. 17 is an illustration of a set of transactions rendered using a set of co-ordinates assigned to hierarchy members where such co-ordinates are arranged in a series of straight lines.

In FIG. 17, a separate set of labels 200, 202 is shown identifying a hierarchy for sources and for destinations. Co-ordinates for the elements in the hierarchies are then assigned positions where the co-ordinates lie on one of a set of parallel the lines 204 with elements highest in the hierarchy lying on lines closest to the centre of the set 204 and the leaf nodes are associated with points lying on lines immediately adjacent the labels.

It will be appreciated that illustration of transactions in this way is particularly suitable for illustration of transactions where the hierarchies to be utilized for source and destination elements are different.

As a further alternative, if the source and destination of the communication transactions are defined by physical location information, such as the longitude and latitude of the base station transceivers involved in a mobile telecommunication transaction, or the address associated with a fixed line telephone call, then these coordinates could be applied to a map display. Communication transactions could then be rendered onto such a geospatial view as arcs.

By way of example, arcs representing communication transactions could be rendered as quadratic Bezier curves, with the direction of the communication encoded clockwise. This could be achieved by determining the vector from the source to the destination, computing the orthogonal to this vector and giving the orthogonal vector a length of half of that of the source to destination vector. This orthogonal vector can then be positioned halfway between the source and destination, and the end point of this orthogonal vector used as the control point for a quadratic Bezier curve. Given that the computation of the orthogonal vector in this way takes into account that vector direction is from the source to the destination, the clockwise direction of the communication transaction is automatically inferred. Markers representing the source and the destination can then be rendered onto the geospatial view/map. For example, these markers could take the form of white dots with a radial gradient from white opaque (innermost) to full transparent blue (outermost). Finally, additive blending techniques could be used to render the sources, the destinations, and the arcs on the geospatial view/map in order to create a 'glow' effect, wherein the intensity provides an indication of the density of sources, destinations, and transactions.

In addition, when displayed on a geospatial view, color can be used to depict whether the number of communication transactions, or some other measure associated with an arc, is lower or higher when compared to a previous point in time (e.g. the previous day). For example, when the measure to be depicted by a color has decreased for a particular arc, this could be represented by a red color, whilst an increase in the measure could be represented by a green color, and any precisely overlapping arcs where one is increasing (green) and the other decreasing (red) could be rendered as yellow. Moreover, the opacity of the arcs can also be used to indicate some value associated with each arc relative to that of the other arcs (e.g. the number of transactions, size or cost of transactions etc). Both the coloring and opacity of the arcs can therefore emphasize the communication transactions that are likely to be of most significance. Representing communication transactions in this way enables users to quickly recognise patterns of communication transactions to and/or from specific locations, and allows users to differentiate between increasing and decreasing levels of communication traffic.

Such a geospatial view could also be supplemented with additional view formats for further exploration of the communication transactions displayed on the geospatial view.

For example, the geospatial view could be supplemented with a line graph that is rendered to illustrate the change in an aggregate measure associated with the transactions over time. To do so, time could be plotted on the y-axis of the line graph with one or more aggregate measures (e.g. number of communication transactions, size of communication transaction, etc) plotted on the x-axis. Such a line graph would provide a further means by which a user could identify significant points in time.

As a further example, the geospatial view could also be supplemented with a bar graph representing the contribution of each communication channel (i.e. source-destination pair) to an aggregate measure at a selected point in time, wherein the relative size of each bar would indicate the relative contribution. Color coding of each bar could then be used to depict whether the measure for that communication channel is lower or higher when compared to a previous point in time (e.g. the previous day).

As a yet further example, the geospatial view could also be supplemented with a matrix view in which individual sources and/or destinations of communications transactions are plotted on the vertical or y-axis, with time being represented on the horizontal or x-axis. For each source and/or destination, the variance in the measure is then rendered onto the matrix view as a heat map, in which the color of a particular area in the matrix represents the value of the measure at the corresponding point in time for the corresponding source/destination. Such a matrix view provides a further means for a user to identify sources and/or destinations that display similar behaviour over time. Furthermore, by apply clustering methods to the rows shown in the matrix, the rows of the matrix can be re-ordered such that sources and/or destinations that display similar behaviour are grouped together.

The ability to analyse and understand patterns of communication transactions can provide a means for identifying the occurrence of significant events (e.g. weather, social, political and economic events), as such events will typically have an impact on communication traffic in the affected areas. For example, the occurrence of a significant event such as a protest or a clash between communities is likely to result in increased volumes of communication transactions in the affected location, probably due to individuals informing each other of the disruption and contacting friends and family.

Moreover, the data analysis system could be configured such that, upon selection of a particular communication transaction or a particular location on a particular date (e.g. by double-clicking on an area of the geospatial view), a default web search platform is opened and an automatically constructed search string is entered into the web search platform in order to search for information on events that may correlate with an identified pattern of communication transactions. The system can therefore provide a means for interpreting patterns in the communication transactions, so as to provide an insight into the potential cause of the pattern.

Alternatively, or in addition, the data analysis system could be provided with or connected to an events database that can be configured to store information regarding significant events (e.g. environmental, weather, seismic, social, political and economic events etc). For example, this information would typically include the date, time, and location of the event, together with descriptive information explaining the event. The data analysis system could then be configured such that, upon selection of a particular communication transaction or a particular location on a particular date (e.g. by double-clicking on an area of the geospatial view), a database query is automatically generated in order to search for events in the events database that could correlate with/be associated with the rendered communication transactions. For example, when a user selects the representation of a communication transaction or a bundle of communication transactions, the data analysis system could automatically query the database for events that occurred at or around the same time and/or location as the selected communication transactions. The data analysis system could then display the results of the query to the user, thereby assisting the user in identifying any events that could be the cause of, or otherwise provide an explanation for, any anomalous communication transactions.

Although in the above described a system has been described which facilitates the analysis of communications transactions and an example has been illustrated which facilitates the analysis of mobile communications transactions within a network, it will be appreciated that the system could be adapted for the imaging, mapping and analysis of any type of transactional data where transactions can be associated with a source and a destination and the source and destination can be associated with nodes in a hierarchy. Thus for example the described system could be adapted to facilitate the review and interrogation of many types of financial or banking data.

Communication data could be combined with data from other sources to facilitate investigation of transactions. Thus for example where transactions can be associated with individuals, communication transaction data could be supplemented with data identifying other interactions between those individuals such as financial transactions.

In the above embodiments transactions are described as being represented as lines where data for representing transactions is rendered to a graphics buffer 14 connected to a display. It will be appreciated that the representation of transactions in such a manner facilitates rapid update of a display 13. More specifically as described transactions are illustrated by a set of primitive elements rendered to a graphics buffer 14. When a subset of transactions is to be displayed instructions to update a display can be limited to an instruction to cause only data for the selected transactions to be utilized to update the display 13. Data for the remaining transactions can, however, still remain within the graphics buffer 14 for use in rendering subsequent displays. Further by causing transactions to be represented in the form of a set of quadrilaterals corresponding to a spliced cubic b-spline, the processing necessary to represent a transaction can be undertaken by a dedicated graphics processor enhancing the speed of the system.

As described in the above embodiments, the coloring of lines representing relationships could be determined based upon some kind of mapping between the number of times a portion of a screen was over-written with the results being scaled so that the full range of colors which can be represented was apparent on the screen. It will be appreciated that in addition or as an alternative to modifying the color of a line as it appears in an image, the thickness of a line could be scaled in a similar way. Thus for example where many similar transactions occur a thicker line could be utilized to represent those transactions.

As with the coloring of lines, the selection of a suitable line thickness could be made by determining the most and least common transactions which are to be represented and mapping those transactions to the thickest and thinnest lines and then representing transactions of intermediate frequency with lines of intermediate thickness.

In such embodiments it may be preferable to map the frequencies based on some kind of scaling such as a logarithmic or power function so that lines corresponding to less frequent transactions are represented using thicker lines than their actual frequency would suggest.

In some embodiments it may be preferable to arrange all transactions to be drawn with lines of the same thickness. In other embodiments it may be preferable to exaggerate the relative thickness of less frequent transactions and minimize the relative thickness representing more frequent transactions.

One approach to achieving such a scaling would be to utilizing a power law such that a value x is mapped to a value $x^p$ where the value p was selected on the basis of representation to be utilized for the greatest value. In such an embodiment, no scaling would occur if p was chosen to be equal to 0, positive values would cause more frequent transactions to be empathized whereas negative values to increase the representation of less frequent values.

Similarly a scaling function may also be utilized to determine the size of the representation of the sections representing the origin or destination for a transaction. Thus for example rather than choosing the location of control point to be evenly distributed along an edge or a circumference the spacing of the control points could be based on the number of transactions to be represented. Again such a value could be based either directly on that number or based on a mapping which scaled the number either to emphasize or de-emphasize the more frequent transactions.

It will also be appreciated that the selection of colors, line thicknesses and the arrangement of control points at the circumference or edge of an image could be determined based on variables other than transaction frequency. Suitable variables could be determined directly from data associated with transactions or alternatively based on variables derived by processing such data.

Although in the examples described in detail hierarchies having three levels have been illustrated and discussed, it will be appreciated that in other embodiments hierarchies having greater more levels could be used.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A non-transitory computer readable medium storing instructions to cause one or more computer processors to perform the actions of:
    selecting of one or more electronically transmitted transactions from a plurality of monitored, electronically transmitted transactions;
    computing a pre-determined hierarchy from the plurality of electronically transmitted transactions;
    arranging the hierarchy of the plurality of electronically transmitted transactions into a tree structure, wherein a leaf node in the lowest level of the hierarchy of the tree structure corresponds to a source or a destination associated with a given electronically transmitted transaction;
    associating elements of the hierarchy with a set of co-ordinates on a display screen; and
    representing each of the plurality of electronically transmitted transactions on the display screen by:
        determining, for each electronically transmitted transaction, a first set of control co-ordinates comprising the co-ordinates associated with elements of a path in the tree structure, the path connecting the source and destination associated with the electronically transmitted transaction via a closest common parent of the electronically transmitted transaction in the hierarchy, the closest common parent being common to the source and destination of the electronically transmitted transaction;
        determining, for each electronically transmitted transaction, a second set of control co-ordinates and drawing a straight line between the second set of co-ordinates associated with the source and destination associated with the electronically transmitted transaction;

calculating a set of control coordinated based on weighted averages of the first and second control co-ordinates using a bundling factor;

representing graphically each of the electronically transmitted transactions as a line drawn utilizing the calculated control co-ordinates for each electronically transmitted transaction;

utilizing the drawing of a selection line on the display by a user to identify an angle of the selection line;

re-rendering a representation of the display within a graphics buffer without updating the display, wherein the re-rendering applies a rotation to the display based on the angle of the selection line such that the selection line corresponds to a row or column; and;

identifying electronically transmitted transactions for which the line representing the electronically transmitted transaction intersects with the selection line in the re-rendered representation of the display within the graphics buffer.

2. The non-transitory computer readable medium of claim 1, wherein the step of identifying electronically transmitted transactions for which the line representing the electronically transmitted transaction intersects with the selection line in the re-rendered representation of the display within the graphics buffer further comprises identifying electronically transmitted transactions for which the line representing the electronically transmitted transaction has a pixel in common with the selection line.

3. The non-transitory computer readable medium of claim 1 further comprising updating the display using the identified electronically transmitted transactions.

4. The non-transitory computer readable medium of claim 3, wherein the step of updating the display using the identified electronically transmitted transactions comprises causing only the identified electronically transmitted transactions to be utilized to update the display.

5. The non-transitory computer readable medium of claim 1 wherein determining for each electronically transmitted transactions a first set of control co-ordinates comprising the co-ordinates associated with elements in a path in the tree structure connecting the source and destination associated with an electronically transmitted transactions via the closest common parent in the hierarchy common to the source and destination further comprises:

determining a list of nodes on the tree structure for connecting the source and destination associated with an electronically transmitted transaction via the closest common parent in the hierarchy common to the source and destination, and removing the node corresponding to the closest common parent if the source and destination for the electronically transmitted transaction are not both child nodes of a single parent node.

6. The non-transitory computer readable medium of claim 1, further comprising appending as control co-ordinates in the set of control co-ordinates for representing an electronically transmitted transaction multiple sets of control co-ordinates associated with the source and destination of the electronically transmitted transaction to be represented.

7. The non-transitory computer readable medium of claim 3, wherein representing each of the electronically transmitted transactions as a line drawn utilizing the calculated control co-ordinates for each electronically transmitted transaction comprises representing each electronically transmitted transaction as an appended series of b-splines as defined by groups of control co-ordinates in the calculated set.

8. The method of claim 7 wherein representing each electronically transmitted transaction as an appended series of b-splines further comprises:

determining co-ordinates for a number of points lying on the curve defined by the appended series of b-splines; and calculating co-ordinates for a set of quadrilaterals for representing the electronically transmitted transaction on the basis of the co-ordinates of the number of points.

9. The non-transitory computer readable medium of claim 8 wherein the calculation of the co-ordinates for a set of quadrilaterals is such to cause the points lying on the curve defined by the appended series of b-splines to lie on the midpoints of opposing ends of the quadrilaterals and the other sides of the quadrilaterals are parallel to a line connecting the midpoints of the opposing ends.

10. The non-transitory computer readable medium of claim 8, further comprising representing said electronically transmitted transactions by coloring said quadrilaterals.

11. The non-transitory computer readable medium of claim 10 wherein the coloring of the quadrilaterals is determined based upon a criterion associated with the electronically transmitted transactions represented by the quadrilateral.

12. The non-transitory computer readable medium of claim 10, wherein the coloring of said quadrilaterals varies along the length of the line drawn utilizing the calculated control co-ordinates.

13. The non-transitory computer readable medium of claim 1, wherein representing financial electronically transmitted transactions as a line drawn utilizing the calculated control co-ordinates for each electronically transmitted transaction further comprises:

rendering each of the lines in a graphics buffer and then combining the rendered images by:

determining maximum color values for areas where lines overlap;

determining color values for rendering lines in a constant color and calculating an alpha blend of the rendered lines; and utilizing the calculated maximum color values and the values of the determined alpha blend of constant color lines to determine the colors to be included in a final display.

14. The non-transitory computer readable medium of claim 1, wherein the plurality of electronically transmitted transactions includes at least one of a communication transaction, a financial transaction, an accounting transaction, an insurance transaction, a security trading transaction, and a security access transaction.

15. A data analysis system for enabling a selection of one or more monitored electronically transmitted transactions from a plurality of electronically transmitted transactions, comprising:

an electronically transmitted transaction database operable to store electronically transmitted transaction records;

a display screen operable to display representations of the electronically transmitted transactions as lines connecting positions associated with a source and a destination for a given electronically transmitted transaction; and a processing module configured to:

calculate a hierarchy of the plurality of electronically transmitted transactions and generating a data tree structure, wherein leaf nodes in the lowest level of the hierarchy correspond to sources and destinations associated with electronically transmitted transaction corresponding to electronically transmitted transaction records stored in the electronically transmitted transaction database;
associate elements of the hierarchy with co-ordinates on the display screen; and
cause the display screen to show the representations of the electronically transmitted transaction by:
  determining for each electronically transmitted transaction a first set of control co-ordinates comprising the co-ordinates associated with elements in a path in the tree structure connecting the source and destination associated with an electronically transmitted transaction via a closest common parent in the hierarchy common to the source and destination;
  determining for each electronically transmitted transaction a second set of control co-ordinates and drawing a straight line between co-ordinates associated with the source and destination;
  calculating as a set of control co-ordinates representing weighted averages of corresponding co-ordinates in the first and second set for the electronically transmitted transaction, the weighted averages being based on a bundling factor;
  representing each of the electronically transmitted transactions as a line drawn utilizing the calculated control co-ordinates for each electronically transmitted transaction;
  utilizing the drawing of a selection line on the display by a user to identify an angle of the selection line;
  rendering a representation of the display within a graphics buffer without updating the display, wherein the re-rendering applies a rotation to the display based on the angle of the selection line such that the selection line corresponds to a row or column; and
  identifying electronically transmitted transactions for which the line representing the electronically transmitted transaction intersects with the selection line in the re-rendered representation of the display within the graphics buffer.

16. The data analysis system of claim 15, wherein the plurality of electronically transmitted transactions includes at least one of a communication transaction, a financial transaction, an accounting transaction, an insurance transaction, a security trading transaction, and a security access transaction.

* * * * *